United States Patent [19]
Shimazaki et al.

[11] Patent Number: 6,122,228
[45] Date of Patent: Sep. 19, 2000

[54] MAGNETO-OPTICAL RECORDING MEDIUM AND REPRODUCTION METHOD THEREFOR

[75] Inventors: Katsusuke Shimazaki; Yoshitane Tsuburaya; Norio Ohta; Hitoshi Watanabe; Hiroki Takao, all of Ibaraki, Japan

[73] Assignee: Hitachi Maxwell, Ltd., Osaka, Japan

[21] Appl. No.: 09/141,305

[22] Filed: Aug. 27, 1998

[30] Foreign Application Priority Data

Aug. 27, 1997 [JP] Japan .................................. 9-244845

[51] Int. Cl.$^7$ ........................... G11B 13/04; G11B 11/00
[52] U.S. Cl. ............................. 369/13; 369/288; 369/116
[58] Field of Search .................... 369/13, 288, 14, 369/110, 116, 284, 286, 275.3, 275.2, 124, 275.1, 283, 275.4; 428/694 EC, 694 MM; 360/59, 114

[56] References Cited

U.S. PATENT DOCUMENTS 5,615,182  3/1997  Murakami et al. ..................... 369/13
5,751,669  5/1998  Shiratori ................................ 369/13

FOREIGN PATENT DOCUMENTS 1143041  6/1989  Japan .
 87350   1/1996  Japan .
9722969  6/1997  WIPO .
9802878  1/1998  WIPO .

OTHER PUBLICATIONS

Journal of Magnetic Society of Japan, vol. 17 Supplement No. S1, p. 201 (1993).

Primary Examiner—Ali Neyzari
Attorney, Agent, or Firm—Birch, Stewart, Kolasch & Birch

[57] ABSTRACT

A magneto-optical recording medium comprises, on a substrate, a dielectric layer, a GdFeCo reproducing layer, a non-magnetic layer, and a TbFeCo recording layer. Upon reproduction, a DC magnetic field Hex is applied in the recording direction, and a reproducing light beam is radiated while being modulated to have a low power and a high power in synchronization with a reproducing clock. The reproducing layer is a magnetic film which changes from in-plane magnetization into perpendicular magnetization at a critical temperature Tcr, which has a compensation temperature Tcomp between room temperature and a Curie temperature Tc, and which satisfies Troom<Tcr<Tcomp<Tco<Tc in relation to a Curie temperature Tco of the recording layer.

4 Claims, 18 Drawing Sheets

TEMPERATURE-DEPENDENT CHARACTERISTIC OF KERR EFFECT

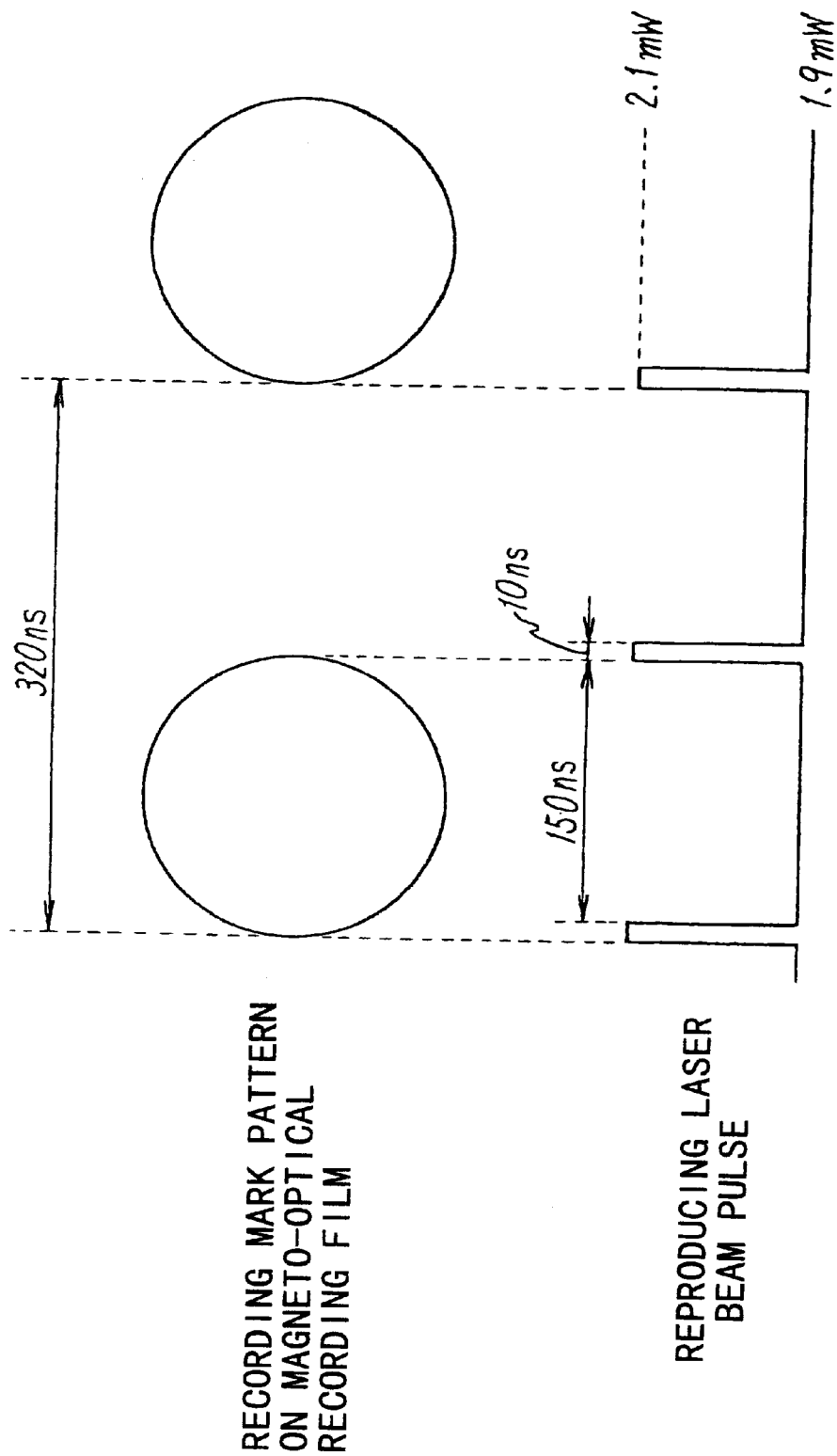

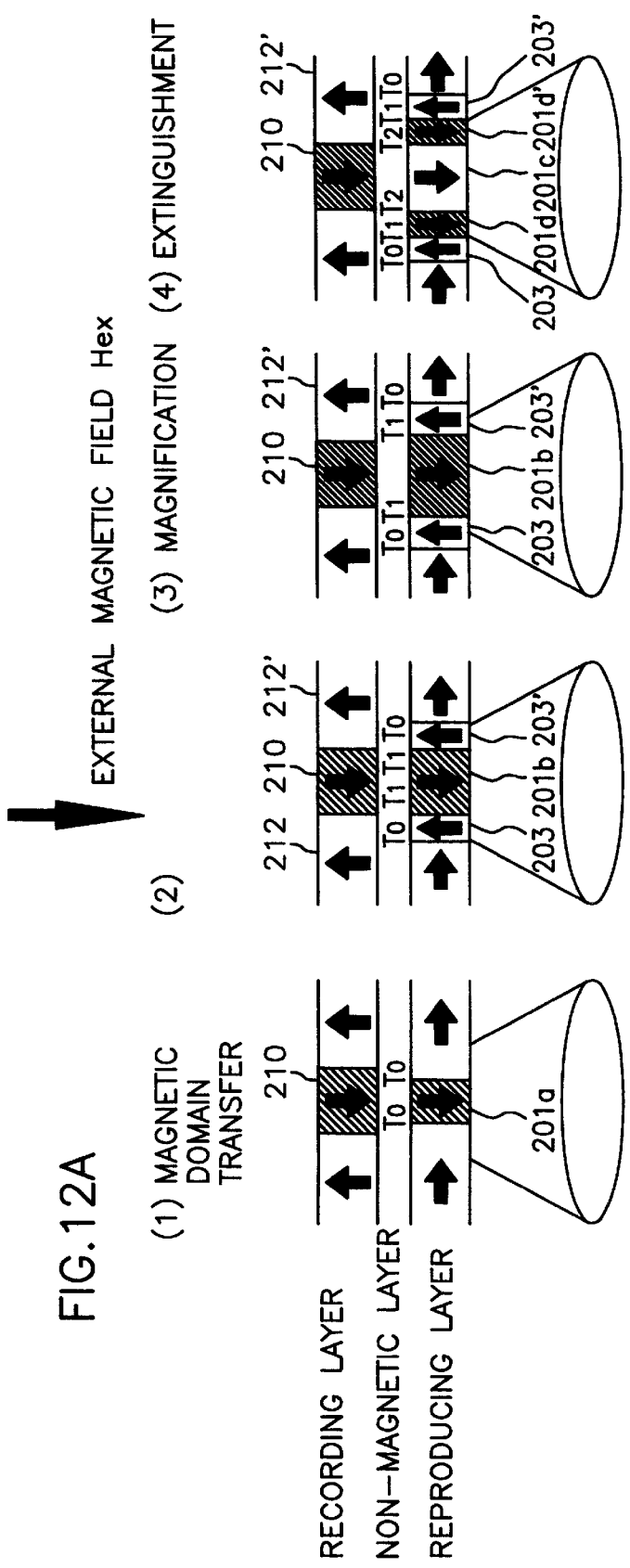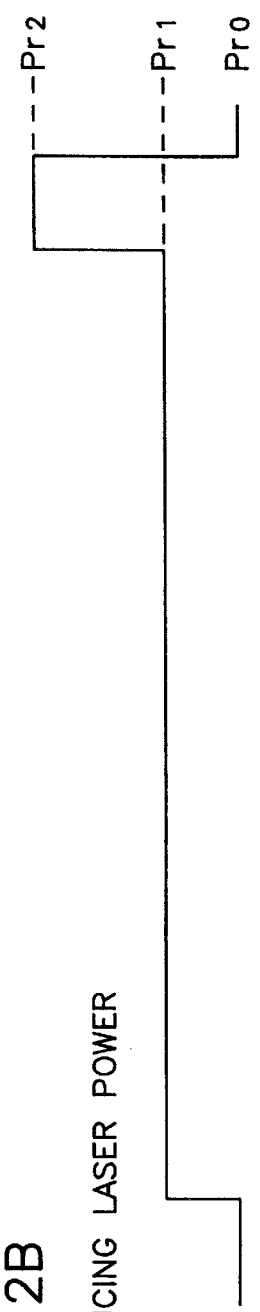

$T_1 < T < T_{comp}$ $T_{comp} < T < T_{co}$

1: SUBSTRATE

3: DIELECTRIC FILM

7: PROTECTIVE FILM

10: MAGNETO-OPTICAL RECORDING FILM

24: SECOND AUXILIARY MAGNETIC FILM

28: FIRST AUXILIARY MAGNETIC FILM

29: NON-MAGNETIC LAYER

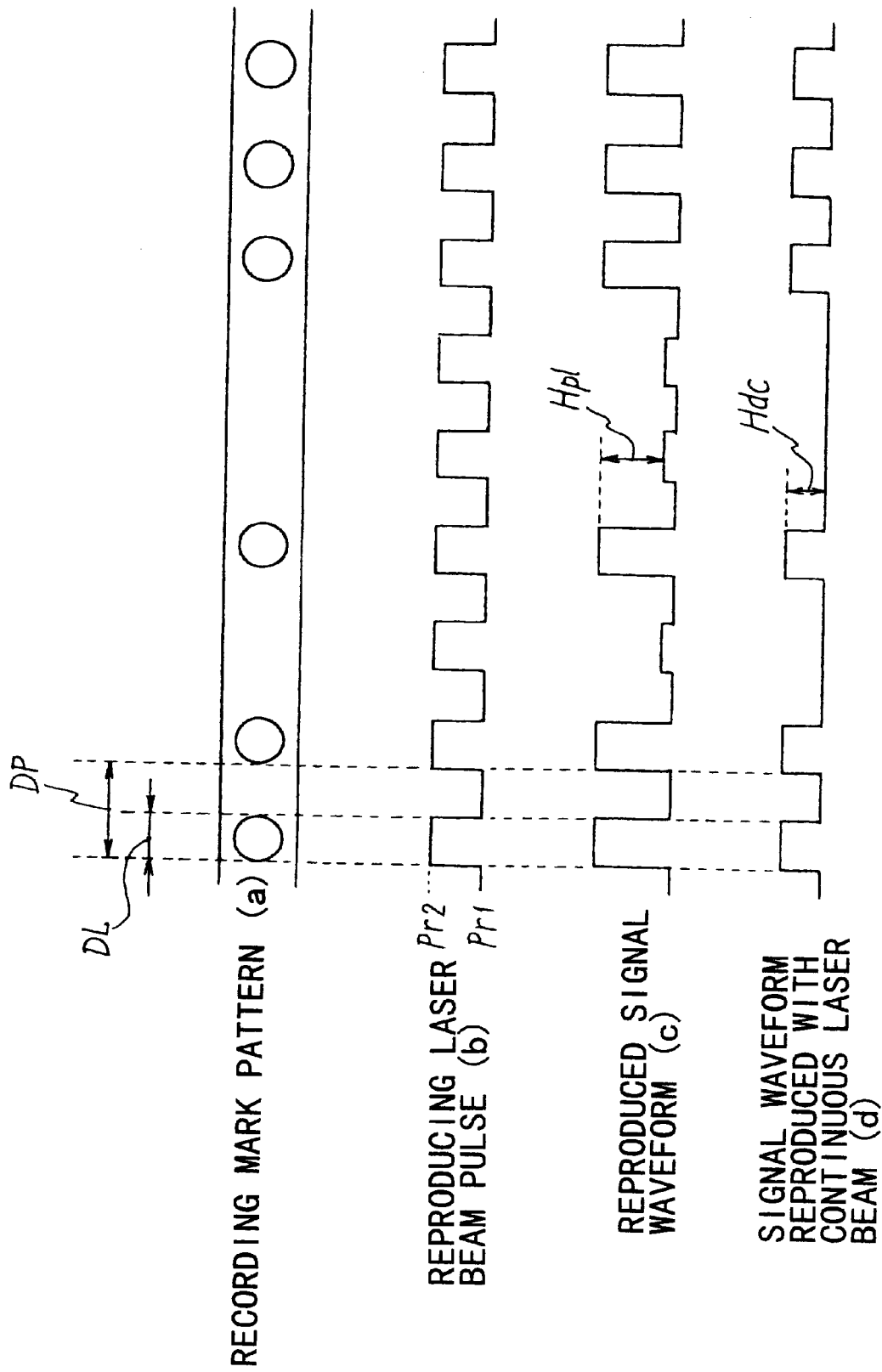

MAGNETO-OPTICAL RECORDING MEDIUM AND REPRODUCTION METHOD THEREFOR

BACKGROUND OF THE INVENTION

1. Field of the Invention

The present invention relates to a magneto-optical recording medium and a reproducing method thereon. In particular, the present invention relates to a magneto-optical recording medium and a reproducing method thereon which are suitable for high density recording and which make it possible to perform reproduction by magnifying a minute recording magnetic domain which is extremely smaller than a reproducing light spot.

2. Description of Related Art

The magneto-optical recording medium is a highly reliable recording medium having a large storage capacity on which information is rewritable. Therefore, the magneto-optical recording medium begins to be practically used as a computer memory and the like. However, a technique for performing recording and reproduction at a higher density is demanded in view of the increase in amount of information and the advance of the apparatus to acquire a compact size. In order to record information on the magneto-optical recording medium, a recording system based on the magnetic field modulation is used, in which a magnetic field having a polarity corresponding to a recording signal is applied to a portion at which the temperature is raised, while irradiating the magneto-optical recording medium with a laser beam. This system makes it possible to perform overwrite recording, in which high density recording has been achieved. For example, recording has been achieved with a shortest mark length of 0.15 µm. A recording system based on the optical modulation has been also practically used, in which recording is performed by radiating a power-modulated light beam corresponding to a recording signal while applying a constant magnetic field.

When it is intended to reproduce information from a recording mark having been recorded at a high density, a problem arises concerning the optical reproducing resolving power which is determined by a spot diameter of a reproducing light beam. For example, it is impossible to perform reproduction while distinguishing a minute mark having a magnetic domain length of 0.15 µm by using a reproducing light beam having a spot diameter of 1 µm. In order to eliminate the restriction for the reproducing resolving power resulting from the optical spot diameter of the reproducing light beam as described above, one approach has been suggested concerning the magnetically induced super resolution technique (MSR) as described, for example, in Journal of Magnetic Society of Japan, Vol. 17, Supplement No. S1, p. 201 (1993). This technique utilizes the occurrence of the temperature distribution over a magnetic film included in a reproducing light beam spot when a magneto-optical recording medium is irradiated with a reproducing light beam. A magnetic mask is generated in the spot so that the effective spot diameter, which contributes to signal reproduction, is reduced. The use of this technique makes it possible to improve the reproducing resolving power without reducing the actual spot diameter of the reproducing light beam. However, in the case of this technique, since the effective spot diameter is decreased by means of the magnetic mask, the amount of light which contributes to the reproduction output is decreased, and the reproduction C/N is lowered to that extent. As a result, it is difficult to obtain sufficient C/N.

Japanese Laid-Open Patent Publication No. 1-143041 discloses a method for performing reproduction on a magneto-optical recording medium comprising a first magnetic film, a second magnetic film, and a third magnetic film which are magnetically coupled to one another at room temperature. Assuming that the first, second, and third magnetic films have Curie temperatures of $T_{C1}$, $T_{C2}$, and $T_{C3}$ respectively, there are given $T_{C2}$>room temperature and $T_{C2}$<$T_{C1}$, $T_{C3}$. The coercive force $H_{C1}$ of the first magnetic film is sufficiently small in the vicinity of the Curie temperature $T_{C2}$ of the second magnetic film. The coercive force $H_{C3}$ of the third magnetic film is sufficiently larger than a required magnetic field in a temperature range from room temperature to a required temperature $T_{PB}$ which is higher than $T_{C2}$. The magneto-optical recording medium is used to perform reproduction while magnifying the recording magnetic domain in the first magnetic film. This method utilizes the increase in temperature of the medium when the reproducing light beam is radiated so that the magnetic coupling between the first and third magnetic films is intercepted. In this state, the magnetic domain in the first magnetic film is magnified by using the externally applied magnetic field and the diamagnetic field acting on the recording magnetic domain. It is noted that this technique uses the second magnetic film in which the Curie temperature is set to be lower than the temperature of the readout portion during reproduction. However, the present invention does not use any magnetic film having such a magnetic characteristic.

Japanese Laid-Open Patent Publication No. 8-7350 discloses a magneto-optical recording medium comprising a reproducing layer and a recording layer on a substrate, on which reproduction can be performed while magnifying a magnetic domain in the recording layer during the reproduction. When the magneto-optical recording medium is subjected to reproduction, an alternating magnetic field is used as a reproducing magnetic field to alternately apply a magnetic field in a direction to magnify the magnetic domain and a magnetic field in the opposite direction. Thus, the magnetic domain is magnified and reduced for each of the magnetic domains.

The present inventors have disclosed, in International Publication WO 97/22969, a method for performing reproduction on a magneto-optical recording medium, in which a reproducing light beam is radiated onto the magneto-optical recording medium having a magneto-optical recording film which is a perpendicularly magnetizable film at a temperature not less than room temperature to detect the magnitude of the magneto-optical effect so that a recorded signal is reproduced.

The magneto-optical recording medium to be used is a magneto-optical recording medium comprising, on the magneto-optical recording film, an auxiliary magnetic film which causes transition from an in-plane magnetizable film to a perpendicularly magnetizable film when the temperature exceeds a critical temperature, with a non-magnetic film interposed therebetween. The magneto-optical recording film and the auxiliary magnetic film satisfy a relationship of room temperature<$T_{CR}$<$T_{CO}$, $T_C$ provided that the magneto-optical recording film and the auxiliary magnetic film have Curie temperatures of $T_{CO}$ and $T_C$ respectively, and the critical temperature of the auxiliary magnetic film is $T_{CR}$. The recording signal is reproduced by irradiating the magneto-optical recording medium with the reproducing light beam which is power-modulated at the same cycle as that of a reproducing clock or at a cycle created by the multiplication of an integer and the reproduction clock. In this reproducing method having the foregoing feature, the reproducing light beam is modulated to have reproducing light powers of $Pr_1$ and $Pr_2$ at the same cycle as that of the reproducing clock or at the cycle created by the multiplication of an integer and the reproducing clock. This patent document discloses that one of the reproducing light powers of $Pr_1$ and $Pr_2$ is a power to cause magnification of the magnetic domain in the auxiliary magnetic film. The principle of the reproducing method will be explained by using a schematic diagram concerning the reproducing method shown in FIG. 19. In this reproducing method, as conceptually shown in FIGS. 6A and 6B, a magneto-optical recording medium is used, which has a structure comprising, on a recording layer 10, an auxiliary magnetic layer 8 with a non-magnetic layer 9 intervening therebetween. At first, a predetermined recording pattern as shown in FIG. 19(a) is recorded on the second type magneto-optical recording medium as the magneto-optical recording medium by using, for example, the optical modulation recording system. In FIG. 19(a), the recording mark is recorded at a shortest mark pitch DP, and the recording mark length DL is set to give DL=DP/2. Upon reproduction, a pulse laser beam, which is modulated to have two kinds of reproducing powers Pr2, Pr1, is used as the reproducing laser beam to be radiated so that the cycle which synchronized with the recording mark position is DP, and the light emission width of the high power Pr2 is DL as shown in FIG. 19(b). The light beam having the low reproducing power Pr1 is always radiated in an erasing state (onto portions at which no recording mark exists), and the light beam having the high reproducing power Pr2 is radiated in a recording state (onto portions at which the recording mark exists) and in the erasing state.

FIG. 19(c) illustrate a reproduced signal waveform obtained by radiating the reproducing pulse laser as shown in FIG. 19(b). On the other hand, FIG. 19(d) illustrates a reproduced signal waveform obtained when the same track is subjected to reproduction by using a continuous light beam having a constant reproducing light power. Pr2 and Pr1 are selected as follows. That is, Pr2 is a recording power to cause the magnification of the magnetic domain in the auxiliary magnetic film 8 as described later on. Pr1 is a power to extinguish the magnified magnetic domain. When the reproducing power is selected as described above, the amplitude $H_{p1}$, which is provided between the recording state and the erasing state observed during the reproduction with the pulse light beam, is allowed to satisfy $H_{p1} > H_{dc}$ with respect to the amplitude $H_{dc}$ obtained upon the reproduction with the constant laser beam. Further, the magnetization information, which is recorded in each of the magnetic domains of the magneto-optical recording film, can be independently magnified and reproduced without being affected by adjacent magnetic domains.

SUMMARY OF THE INVENTION

An object of the present invention is to provide a reproducing method which is achieved by further improving the reproducing method disclosed in International Publication WO 97/22969.

The present invention has been made in order to solve the problems involved in the conventional technique, by means of a method different from the methods described in Japanese Laid-Open Patent Publication Nos. 1-143041 and 8-7350, an object of which is to provide a magneto-optical recording medium and a method for reproducing signals thereon, wherein a reproduced signal is obtained with sufficient C/N even when a minute magnetic domain is subjected to recording.

Another object of the present invention is to provide a magneto-optical recording medium and a reproducing method thereon which make it possible to reliably erase a magnified magnetic domain immediately after reproduction of a recording magnetic domain even when the magnetic domain is magnified during reproduction.

According to a first aspect of the present invention, there is provided a method for performing reproduction on a magneto-optical recording medium for reproducing a recorded signal by irradiating the magneto-optical recording medium with a reproducing light beam to detect magnitude of an magneto-optical effect, the reproducing method comprising the steps of:

using, as the magneto-optical recording medium, a magneto-optical recording medium comprising a magneto-optical recording film having perpendicular magnetization, an auxiliary magnetic film which transfers from an in-plane magnetizable film to a perpendicularly magnetizable film when a temperature exceeds a critical temperature Tcr and a non-magnetic film intervened between the magneto-optical recording film and the auxiliary magnetic film, the magneto-optical recording medium having a magnetic characteristic to satisfy a relationship of room temperature<Tcr<Tcomp<Tco<Tc concerning a Curie temperature Tco of the magneto-optical recording film and a Curie temperature Tc and a compensation temperature Tcomp of the auxiliary magnetic film; and executing reproduction of the recorded signal through the steps of irradiating the magneto-optical recording medium with the reproducing light beam which is power-modulated to have at least two light powers of $Pr_1$ and $Pr_2$ at the same cycle as that of a reproducing clock or at a cycle created by the multiplication of an integer and the reproducing clock while applying a DC magnetic field so that a recording magnetic domain in the magneto-optical recording film is transferred to the auxiliary magnetic film, the transferred magnetic domain is magnified, and the magnified magnetic domain is reduced or extinguished, wherein:

the magneto-optical recording medium is specified, under a condition in which an external magnetic field Hex is applied to the magneto-optical recording medium, such that a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

It is preferable in the reproducing method of the present invention that the light power $Pr_1$ of the reproducing light beam is a power to heat the auxiliary magnetic film to a temperature from Tcr to Tcomp so that the recording magnetic domain in the magneto-optical recording film is transferred to the auxiliary magnetic film and the magnetic domain is magnified, and the light power $Pr_2$ of the reproducing light beam is a power to heat the auxiliary magnetic film to a temperature from Tcomp to Tco so that the magnified magnetic domain is reduced or extinguished.

The transfer magnetic field may be represented by a sum of the external magnetic field Hex and a static magnetic field Ht from the magneto-optical recording film, and the coercive force of the auxiliary magnetic film in the perpendicular direction may be represented by a sum of a coercive force Hr in the perpendicular direction of the magnetic domain subjected to the transfer and an exchange coupling force Hw exerted on the magnetic domain subjected to the transfer by adjoining magnetic domains.

The method for transferring the recording magnetic domain inscribed on the recording layer to the reproducing layer so that the transfer signal on the reproducing layer is magnified and read in order to obtain a high quality reproduced signal is called "magnetic amplification-mediated magneto-optical system (MAMMOS)", which has been confirmed by the present applicant by using the external magnetic field modulation reproducing method (WO 98-02878). In the external magnetic field modulation reproducing method, the magnification and the reduction are executed for the magnetic domain transferred to the reproducing layer by using an alternating magnetic field during reproduction. In the present invention, experiments have been carried out from various viewpoints for the magneto-optical system based on the magnetic amplification to advance detailed analysis and investigation. As a result, the present inventors have succeeded in development of the method which makes it possible to reliably realize the magnification and the reduction of the transferred magnetic domain by making modulation to give two or more kinds of reproducing light powers by using the direct current magnetic field.

Explanation will be made for the principle of the reproducing method on the magneto-optical recording medium according to the first aspect of the present invention. The reproducing method is based on the use of the magneto-optical recording medium comprising the magneto-optical recording film having the perpendicular magnetization, and the auxiliary magnetic film which causes transition from the in-plane magnetizable film to the perpendicularly magnetizable film when the temperature exceeds the critical temperature Tcr, with the non-magnetic film interposed therebetween. FIG. 9 shows an illustrative structure of the magneto-optical recording medium of this type. A magneto-optical disk 90 shown in FIG. 9 comprises, in a stacked form on a substrate 1, a dielectric film 3, an auxiliary magnetic film 8, a non-magnetic film 3, a magneto-optical recording film 10, and a protective film 7. The auxiliary magnetic film 8 has a compensation temperature Tcomp between a critical temperature Tcr and its Curie temperature Tc. The magneto-optical recording medium 90 satisfies the relationship of room temperature<Tcr<Tcomp<Tco<Tc concerning the Curie temperature Tco of the magneto-optical recording film 10, the critical temperature Tcr, the Curie temperature Tc, and the compensation temperature Tcomp of the auxiliary magnetic film 8.

Reproduction is performed in accordance with the reproducing method of the present invention by radiating the light power-modulated reproducing light beam while applying the external DC magnetic field to the magneto-optical recording medium 90 having the magnetic characteristic as described above. FIG. 11 shows magnetic characteristics of the magneto-optical recording film 10 and the auxiliary magnetic film 8 of the magneto-optical disk 90 in a state in which the constant DC magnetic field Hex is applied to the magneto-optical recording medium 90 in the recording direction. The magnetic temperature curve A shown in FIG. 11 denotes a temperature-dependent change in transfer magnetic field (static magnetic field) generated by the magnetization of the recording layer from the magneto-optical recording film 10 (hereinafter simply referred to as "recording layer") to the auxiliary magnetic film 8 (hereinafter simply referred to as "reproducing layer"). The transfer magnetic field of the curve A represents the magnitude of the magnetic field obtained by adding an amount of offset of the external magnetic field Hex. Therefore, the magnetic filed having the magnitude of (Hex−Ht) and the magnetic field having the magnitude of (Hex+Ht) exist as the entire transfer magnetic field depending on the direction of the magnetic domain of the recording layer, with a boundary of the Curie temperature Tco of the recording layer. The two magnetic fields constitute the curve A. In FIG. 9, the downward direction is the recording direction. Hex is applied in the downward direction. In this case, the external magnetic field Hex is adjusted to be small as compared with the magnitude of the static magnetic field Ht in the initializing direction generated from the magnetization of the recording layer at room temperature. Therefore, the entire transfer magnetic field includes those directed in the upward direction (negative) and in the downward direction (positive) depending on the magnetization direction of the recording magnetic domain in the recording layer as illustrated by the curve A.

The magnetic temperature curve B denotes the temperature-dependent change of the coercive force in the perpendicular direction of the reproducing layer in a state of having the perpendicular magnetization. The coercive force is represented by Hr+Hw as including the pure coercive force Hr of the magnetic domain in the reproducing layer in the perpendicular direction and the magnetic field Hw corresponding to a virtual magnetic field regarded to be applied by generation of the magnetic wall of the reproducing layer (in other words, the exchange coupling magnetic field in the in-plane direction of the reproducing layer). That is, Hr+Hw represents the magnetic field necessary to perform inversion of the magnetization in the direction perpendicular to the film surface of the reproducing layer. As shown in FIG. 11, the magnetization in the direction perpendicular to the film surface of the reproducing layer appears at a temperature which is not less than the critical temperature Tcr (T0 in FIG. 11) at which the reproducing layer behaves as a perpendicularly magnetizable film. The coercive force is maximal at the compensation temperature Tcomp because the magnetization of the reproducing layer is zero.

The temperature curves A and B shown in FIG. 11 are divided into those belonging to three areas (a) to (c) as shown in FIG. 11. The three areas (a) to (c) correspond to the three steps of i) magnetic domain transfer from the recording layer to the reproducing layer, ii) magnification of the transferred magnetic domain in the reproducing layer, and iii) extinguishment of the magnified magnetic domain, in the reproducing method of the present invention as shown in FIG. 12A respectively. Accordingly, explanation will be made with reference to FIG. 12 for the magnetic characteristics required for the recording layer and the reproducing layer in the areas (a) to (c) shown in FIG. 11. Arrows in the recording layer and the reproducing layer shown in FIG. 12A denote the direction of the magnetic moment of the rare earth metal included in each of the magnetic domains.

The area (a) is a temperature area in which the magnetic domain is transferred from the recording layer to the reproducing layer in the reproducing method of the present invention, which belongs to a temperature range of T0 to T1 in FIG. 12A. T0 means the critical temperature Tcr, and T1 is a temperature at which the magnetic temperature curve A on the side of Hex−Ht initially intersects the magnetic temperature curve B. The temperature range T0 to T1 can be achieved by adjusting the light power of the reproducing light beam to be a relatively low power as described later on. In order to actually perform the magnetic transfer as shown in FIG. 12A(1) in this temperature area, it is necessary that the magnitude of the transfer magnetic field in this temperature area exceeds the coercive force of the reproducing layer in the perpendicular direction. That is, when the magnetization recorded on the recording layer is in the direction ↓ (recording direction), it is necessary that the transfer magnetic field represented by Hex+Ht is larger than Hr+Hw or −(Hr+Hw) (requirement for magnetic domain transfer). When the magnetization recorded on the recording layer is in the direction ↑ (erasing direction), it is necessary that the negative transfer magnetic field represented by Hex−Ht is smaller than the coercive force Hr+Hw or −(Hr+Hw) of the reproducing layer in the perpendicular direction (requirement for magnetic domain transfer).

On the other hand, when the magnetic temperature curves A and B are compared with each other in the area (a) shown in FIG. 11, it is appreciated that the relationships of the following expressions (a1) to (a3) hold.

$$Hr<Hex+Ht-Hw \tag{a1}$$

$$-Hr>Hex-Ht+Hw \tag{a2}$$

$$Hr>Hex-Ht-Hw \tag{a3}$$

Therefore, the area (a) satisfies the magnetic domain transfer requirement described above, and the recording magnetic domain in the recording layer can be transferred to the reproducing layer regardless of the direction of magnetization thereof. FIG. 12A (1) shows a case in which the magnetization in the direction ↓; recorded in a magnetic domain 210 in the recording layer is transferred to an area of the reproducing layer at a temperature which exceeds the temperature T0 within the reproducing light spot so that a transferred magnetic domain 201a is formed.

Subsequently, in the area (b) shown in FIG. 11, the magnetic domain magnification is performed for the magnetic domain 201b transferred to the reproducing layer as shown in FIG. 12A (2) and (3). This temperature area resides in a range indicated by T1 to T2 in FIG. 11. The temperature T2 is a temperature at which the magnetic temperature curve A on the side of Hex−Ht intersects the magnetic temperature curve B on the high temperature side. The magneto-optical disk having the magnetic characteristic shown in FIG. 11 is adjusted such that T2 is approximately coincident with the compensation temperature Tcomp of the reproducing layer (the temperature exists between the compensation temperature Tcomp and the Curie temperature Tco of the recording layer, and the temperature is a temperature extremely close to the compensation temperature Tcomp) in relation to the external magnetic field Hex. In this temperature area, as shown in FIG. 12A (2), magnetic domains 203, 203', which are subjected to magnetic transfer from magnetic domains 212, 212' in the recording layer in the upward direction, exist on both sides of the magnetic domain 201b transferred to the reproducing layer, as a result of being heated to T0 to T1 within the reproducing light spot. In order to allow the magnetic domain 201b transferred to the reproducing layer to start magnification in the in-plane direction, it is necessary that the directions of the magnetic domains 203, 203' disposed on the both sides are directed to the recording direction (direction ↓) in the same manner as the magnetic domain 201b. The magnetic domains 203, 203' receives the transfer magnetic field (Hex−Ht) (totally in the direction ↑) obtained by adding, to the external magnetic field Hex, the static magnetic field Ht in the upward direction from magnetic domains 212 in the recording layer existing just thereover. On the other hand, the magnetic domains 203, 203' have the coercive force in the perpendicular direction including the exchange coupling magnetic field Hw (in the downward direction) exerted by the magnetic domain 201b and the coercive force Hr to invert the magnetization of the magnetic domains 203, 203' themselves. Therefore, when the coercive force in the perpendicular direction (Hr+Hw) is made larger than the transfer magnetic field (Hex−Ht) of the magnetic domains 203, 203', the magnetic domains 203, 203' are inverted (requirement for magnetic domain inversion).

It is appreciated that the following relational expressions hold in the area (b) according to the relative magnitude between the magnetic temperature curves A and B.

$$Hr<Hex+Ht-Hw \tag{b1}$$

$$-Hr<Hex-Ht+Hw \tag{b2}$$

$$Hr>Hex-Ht-Hw \tag{b3}$$

The foregoing expression (b2) is the condition of magnetic domain inversion itself under which the coercive force (Hr+Hw) in the perpendicular direction is larger than the transfer magnetic field Hex−Ht (in the upward direction) of the magnetic domains 203, 203'. Therefore, the magnetic domain magnification occurs in the area (b) for the magnetic domain 201b in the reproducing layer as shown in FIG. 12A (3). According to the relationship of (b2), it is demonstrated that no magnetic domain in the downward direction appears in the reproducing layer when there is no magnetic domain in the recording direction in the reproducing layer, in the temperature area (b). In FIG. 12A (3), the both sides of the magnified magnetic domain 201b are the temperature area of T0 to T1. Therefore, the magnetic domains 203, 203' in the direction ↑, which are subjected to the magnetic domain transfer from the magnetic domains 212, 212' in the recording layer, exist therein.

Subsequently, in the area (c), the transferred and magnified magnetic domain is inverted (extinguished), and a magnetic domain 201c in the erasing direction is formed as shown in FIG. 12A (4). This temperature area exists in a range from T2 which slightly exceeds the compensation temperature of the reproducing layer, to the Curie temperature Tco of the recording layer. The magnified and reproduced magnetic domain can be extinguished or reduced by applying the reproducing magnetic field in the erasing direction, i.e., by using the alternating magnetic field as the reproducing magnetic field. However, in the reproducing method of the present invention, the DC magnetic field is used to extinguish the magnified magnetic domain by power-modulating the reproducing light beam to have the power higher than the reproducing light power used to perform the magnetic transfer and the magnification. The reproducing light power may be modulated to be further small in order to extinguish the magnified magnetic domain, as described in the first embodiment of the reproducing method on the magneto-optical recording medium according to the present invention as described later on.

Explanation will be made with reference to FIGS. 13A and 13B for the principle to invert (extinguish) the magnified magnetic domain in the area (c). FIGS. 13A and 13B illustrate the temperature-dependent change of the direction and the magnitude of sub-lattice magnetization of the rare earth metal and the transition metal of the magnetic domain 210 in the recording layer composed of the rare earth-transition metal (TbFeCo alloy) and the magnetic domain 201b in the reproducing layer composed of the rare earth-transition metal (GdFeCo alloy) subjected to the magnetic domain transfer therefrom shown in FIG. 12A (2). As shown in FIG. 13A, when the temperature of the reproducing layer is less than the compensation temperature Tcomp, then the magnetization of the rare earth metal in the reproducing layer is dominant, and it is parallel to the magnetization direction of the recording layer of the transfer source (the magnetization of the transition metal is dominant). Subsequently, when the temperature of the reproducing layer exceeds the compensation temperature Tcomp by radiating the high power laser in accordance with the reproducing method of the present invention, the magnetic moment of the transition metal in the reproducing layer is dominant. It is appreciated that the following expressions (c1) and (c2) hold according to the relative magnitude of the magnetic temperature curves A and B of the reproducing layer and the recording layer in the area (c) shown in FIG. 11.

$$Hr<Hex+Ht-Hw \quad (c1)$$

$$Hr<Hex-Ht-Hw \quad (c2)$$

That is, the coercive force Hr of the magnetic domain 201b is smaller than the entire magnetic field (Hex+Ht−Hw or Hex−Ht−Hw) in the recording direction acting on the magnetic domain 201b. As a result, when the temperature of the reproducing layer is not less than the compensation temperature Tcomp (exactly, when it is not less than T2), the dominant magnetic moment of the transition metal is inverted to be directed in the recording direction as shown in FIG. 13B. Therefore, the magnetic moment of the rare earth metal in the downward direction of the magnified magnetic domain 201b shown in FIG. 12A (3) is inverted in the area which is heated to the temperature not less than the temperature of the area (c), i.e., not less than the compensation temperature Tcomp. Thus, the inverted magnetic domain 201c is generated (FIG. 12A (4)). The magnetic domains 201d, 201d', which are disposed on the both sides of the inverted magnetic domain 201c, have their temperatures ranging from T1 to T2. Therefore, the magnetic domains 201d, 201d' have the same magnetization direction as that of the magnified magnetic domain 201b.

In the reproducing method according to the present invention, the three temperature areas (a) to (c) can be achieved by modulating the reproducing light power to have at least the two power levels $Pr_1$ and $Pr_2$ as shown in FIG. 12B. That is, the light power $Pr_1$ of the reproducing light beam may be the power for heating the auxiliary magnetic layer to the temperature of Tcr to Tcomp and making it possible to transfer the recording magnetic domain in the magneto-optical recording film to the reproducing layer and magnify the magnetic domain. The light power $Pr_2$ of the reproducing light beam may be the power for heating the auxiliary magnetic layer to the temperature of Tcomp to Tco and reducing or extinguishing the magnified magnetic domain as described above. The $Pr_1/Pr_2$ power-modulated reproducing light beam is used as the reproducing light beam in synchronization with the reproducing clock. Thus, the recording magnetic domain in the recording layer can be subjected to reproduction through the steps of i) transfer to the reproducing layer, ii) magnification of the transferred magnetic domain, and iii) extinguishment of the magnified magnetic domain.

According to a second aspect of the present invention, there is provided a magneto-optical recording medium having at least a magneto-optical recording film on a substrate, the magneto-optical recording medium comprising the magneto-optical recording film having perpendicular magnetization, an auxiliary magnetic film which transfers from an in-plane magnetizable film to a perpendicularly magnetizable film when a temperature exceeds a critical temperature Tcr with a non-magnetic film intervened between the magneto-optical recording film and the auxiliary magnetic film, wherein a relationship of room temperature<Tcr<Tcomp<Tco<Tc holds concerning a Curie temperature Tco of the magneto-optical recording film and a Curie temperature Tc and a compensation temperature Tcomp of the auxiliary magnetic film, and wherein under a condition in which an external magnetic field Hex is applied to the magneto-optical recording medium, a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

The magneto-optical recording medium according to the second aspect of the present invention is a magneto-optical recording medium which is preferably used for the reproducing method according to the first aspect of the present invention. Even in the case of a minute magnetic domain which is smaller than the light spot, the magnetic An domain can be subjected to reproduction independently from other magnetic domains to give an amplified reproduced signal, by performing reproduction on the magneto-optical recording medium by using the reproducing method according to the first aspect of the present invention. It is preferable that the temperature $T_2$, at which the temperature curve A and the temperature curve B intersect, satisfies $Tcomp \leq T_2 \leq Tco$.

According to a third aspect of the present invention, there is provided a magneto-optical recording medium having at least a magneto-optical recording film on a substrate, the magneto-optical recording medium comprising:

a first auxiliary magnetic film which causes transition from a perpendicularly magnetizable film to an in-plane magnetizable film when a temperature exceeds a critical temperature $Tcr_{11}$; and a second auxiliary magnetic film which causes transition from an in-plane magnetizable film to a perpendicularly magnetizable film when the temperature exceeds a critical temperature $Tcr_{12}$.

Explanation will be made with reference to FIG. 14 for an example of the structure of the magneto-optical recording medium according to the third aspect of the present invention. As shown in FIG. 14, the magneto-optical recording medium 100 successively comprises, on a magneto-optical recording film 10, a first auxiliary magnetic film 28, a non-magnetic film 29, and a second auxiliary magnetic film 24. The magneto-optical recording film 10 is a perpendicularly magnetizable film. The first auxiliary magnetic film 28 is a magnetic film which causes transition from a perpendicularly magnetizable film to an in-plane magnetizable film when the temperature exceeds the critical temperature $Tcr_{11}$. The second auxiliary magnetic film 24 is a magnetic film which causes transition from an in-plane magnetizable film to a perpendicularly magnetizable film when the temperature exceeds the critical temperature $Tcr_{12}$. It is assumed herein that materials and compositions of the magnetic films are adjusted so that the critical temperature $Tcr_{11}$ of the first auxiliary magnetic film is higher than the critical temperature $Tcr_{12}$ of the second auxiliary magnetic film. The second auxiliary magnetic film 24 functions as a reproducing layer.

Explanation will be made with reference to FIGS. 16A to 16C for the principle of reproduction on the magneto-optical recording medium according to the third aspect. FIG. 16A conceptually illustrates main components of the magneto-optical recording medium shown in FIG. 14. It is assumed that the magnetization in the upward direction is recorded in a magnetic domain 22 of the magneto-optical recording film 10. The magneto-optical recording film 10 and the first auxiliary magnetic layer 28 make exchange coupling to one another. The same magnetization as that of the magnetic domain 22 is transferred to a magnetic domain 28a of the first auxiliary magnetic layer 28 disposed just under the magnetic domain 22. When the magneto-optical recording medium is irradiated with a reproducing light means, and the temperature begins to rise, then the transition occurs from the in-plane magnetization to the perpendicular magnetization in an area of the second auxiliary magnetic film 24 in which its temperature exceeds the critical temperature $Tcr_{12}$. The area subjected to the transition corresponds to magnetic domains 24a, 24b shown fin FIG. 16B. During the transition, the magnetic domain 24a is aligned in the same magnetization direction as that of the magnetic domain 22 as shown in FIG. 16B by the aid of the magnetostatic coupling force exerted by the magnetic domain 22 of the recording layer 10 disposed just thereover and the magnetic domain 28a of the first auxiliary magnetic film 28. FIG. 16B illustrates the temperature-rising process of the magneto-optical recording medium effected by the reproducing light beam, and it represents a magnetization state in which the temperature T of the magneto-optical recording medium does not arrive at a maximum arrival temperature yet and the temperature is within a range of $Tcr_{12} < T < Tcr_{11}$. In this state, the recording layer 10, the first auxiliary magnetic layer 28, and the second auxiliary magnetic layer 24 are magnetically coupled (magnetostatically coupled) to one another, and any of them exhibits the perpendicular magnetization. Minute magnetic domains 24b, which have the magnetization in the downward direction by the aid of the magnetostatic coupling force exerted by the both magnetic domains adjacent to the magnetic domain 22 and the magnetic domains in the downward direction in the first auxiliary magnetic film 28 disposed just thereunder, are present on both adjoining sides of the magnetic domain 24a.

When the temperature of the medium is further raised to arrive at the heating maximum temperature, if the temperature of the high temperature area of the first auxiliary magnetic layer 28 exceeds the critical temperature $Tcr_{11}$, then the coercive force of the first auxiliary magnetic layer 28 is lowered, and thus the first auxiliary magnetic layer 28 in the high temperature area causes transition from the perpendicular magnetization to the in-plane magnetization. As a result, a magnetic domain 28a' is formed as shown in FIG. 16C.

FIG. 17 shows a relationship between the temperature distribution and the magnetization state of the medium shown in FIG. 16C. In the case of this magneto-optical recording medium, there is given $Tcr_{12} < Tcr_{11}$ as described above. Accordingly, as shown in FIG. 17, the area, in which the temperature exceeds $Tcr_{12}$ in the temperature distribution of the medium, is wider than the area in which the temperature exceeds $Tcr_{11}$. The transition occurs from the in-plane magnetization to the perpendicular magnetization in the area in which the temperature exceeds $Tcr_{12}$ in the second auxiliary magnetic layer 24. The transition occurs from the perpendicular magnetization to the in-plane magnetization in the area in which the temperature exceeds $Tcr_{11}$ in the first auxiliary magnetic layer 24. Therefore, the magnetic domain 24a' having the perpendicular magnetization in the second auxiliary magnetic layer 24 is larger than the magnetic domain 28a' having the in-plane magnetization in the first auxiliary magnetic layer 24. The reproducing light power and $Tcr_{12}$ are adjusted so that the area, in which the temperature exceeds $Tcr_{12}$ in the second auxiliary magnetic layer 24 upon irradiation with the reproducing light beam, is larger than the magnetic domain in the recording layer 10.

On the other hand, the magnetic domain 28a' in the first auxiliary magnetic layer 28 has the in-plane magnetization. Therefore, the magnetic influence can be intercepted, which would be otherwise exerted from the magneto-optical recording film 10 to the second auxiliary magnetic film 24, due to, for example, the leakage magnetic field and the static magnetic field caused by the magnetization in the direction ↓; existing on both adjoining sides of the magnetic domain 22. Accordingly, it is possible to facilitate the magnification of the magnetic domain 24a'. The magnification of the magnetic domain increases the reproduced signal. It is considered that C/N is improved owing to the function of the first auxiliary magnetic film 24 to cause magnetic interception. In order to more effectively use the magnetically intercepting function of the first auxiliary magnetic film 28, it is preferable that the critical temperature $Tc_{11}$ of the first auxiliary magnetic film 28 and the reproducing light power are selected so that the area, in which the temperature exceeds $Tcr_{11}$ in the first auxiliary magnetic layer 28 during reproduction, is larger than the recording magnetic domain 11. In order to obtain a sufficiently large reproduced signal by the aid of the magnetic domain magnification in the second auxiliary magnetic layer 24, it is preferable that the critical temperature $Tc_{12}$ of the second auxiliary magnetic film 24 and the reproducing light power are selected so that the area, in which the temperature exceeds $Tcr_{12}$ in the second auxiliary magnetic layer 24 during reproduction, is larger than the recording magnetic domain 11. In order to simultaneously satisfy the facilitating effect for magnifying the magnetic domain and the magnetically intercepting function of the first auxiliary magnetic film 28, it is desirable to appropriately control the relationship ($\Delta T = Tcr_{11} - Tcr_{12}$) between the critical temperature $Tcr_{11}$ of the first auxiliary magnetic film 28 and the critical temperature $Tcr_{12}$ of the second auxiliary magnetic film 24.

The effect of the magnification of the magnetic domain of the second auxiliary magnetic film 24, i.e., the reproduced signal intensity is maximized when the transferred magnetic domain in the second auxiliary magnetic film 24 is magnified to be not less than the reproducing light spot diameter. In this state, an extremely large reproduction output, which is determined by only the performance index of the second auxiliary magnetic film 24 and the reproducing light beam, is obtained regardless of the size and the shape of the magnetic domain recorded in the magneto-optical recording film 10. After the reproduction, i.e., after the unit for radiating the reproducing light beam is moved, the readout portion is cooled to be not more than $Tcr_{12}$, and the second auxiliary magnetic film is in the in-plane magnetization state to return to the state shown in FIG. 16A. The coercive force of the magneto-optical recording film 10 is sufficiently large even at the temperature during the reproducing operation as described above. Therefore, the information recorded as magnetization is completely retained.

It is desirable for the magneto-optical recording medium according to the third aspect of the present invention that a relationship of room temperature<$Tcr_{12}$<$Tcr_{11}$<Tco, $Tc_1$, $Tc_2$ holds concerning a Curie temperature Tco of the magneto-optical recording film, a Curie temperature Tc, and the critical temperature $Tcr_{11}$ of the first auxiliary magnetic film, and a Curie temperature $Tc_2$ and the critical temperature $Tcr_{12}$ of the second auxiliary magnetic film.

BRIEF DESCRIPTION OF THE DRAWINGS

FIG. 7 shows timing for irradiating recording marks with the reproducing pulse light beam modulated to have reproducing powers Pr1 and Pr2 determined in a preparatory experiment performed in the first embodiment.

FIG. 12A explains the process for reproducing the recording magnetic domain in the magneto-optical recording layer from the magneto-optical recording layer by irradiating the magneto-optical recording medium of the present invention with the optically modulated reproducing light beam, illustrating the directions of the magnetic domains in the recording layer and the reproducing layer, and FIG. 12B shows the optically modulated reproducing light power as illustrated in FIG. 12A.

FIG. 19 shows a timing chart illustrating the principle of the reproducing method on the magneto-optical recording medium of the present invention.

DESCRIPTION OF THE PREFERRED EMBODIMENTS

Embodiments and Examples of the magneto-optical recording medium and the reproducing method thereon according to the present invention will be explained with reference to the drawings. However, the present invention is not limited thereto.

First Embodiment

This embodiment is illustrative of specified embodiments of the medium belonging to the magneto-optical recording medium of the present invention and the reproducing method for performing reproduction by using the medium while changing the reproducing laser beam in a pulse form. A medium having a structure shown in FIG. 1 is used as the magneto-optical recording medium.

[Production of magneto-optical recording medium]

Figure 1:
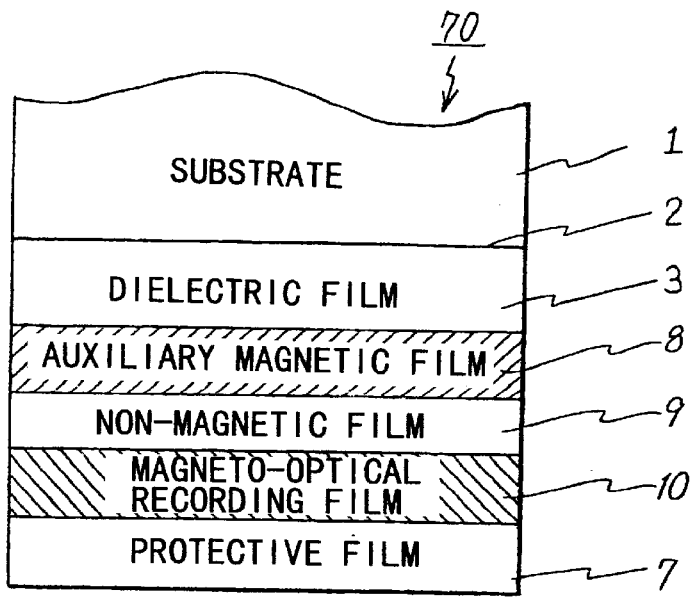
FIG. 1 conceptually shows a stacked structure of a magneto-optical recording medium belonging to a second type of the present invention.

A glass substrate was used as a transparent substrate 1 of the magneto-optical recording medium 70 shown in FIG. 1. A transparent resin film 2, onto which a preformat pattern is transferred, is formed on one surface of the glass substrate. A dielectric film 3 is composed of SiN, and it is formed to have a film thickness for causing multiple interference with the reproducing laser beam so that the apparent Kerr rotation angle is increased. An auxiliary magnetic film 8 is composed of a ferri-magnetic amorphous alloy GdFeCo comprising rare earth and transition metals. The auxiliary magnetic film 8 exhibits the in-plane magnetic anisotropy at a temperature from room temperature to a certain critical temperature $T_{CR}$ not less than room temperature, and it exhibits the perpendicular magnetic anisotropy at a temperature not less than $T_{CR}$. A non-magnetic film 9 is composed of SiN, and it is inserted to magnetostatically couple the auxiliary magnetic film 8 and a magneto-optical recording film 10. The magneto-optical recording film 10 is composed of a ferrimagnetic amorphous alloy TbFeCo comprising rare earth and transition metals, and it has the perpendicular magnetic anisotropy at a temperature from room temperature to the Curie temperature. A protective film 7 is composed of SiN, and it is provided to protect the thin films stacked between the substrate 1 and the protective film 7, from chemical harmful influences such as corrosion.

The dielectric film 3, the auxiliary magnetic film 8, the non-magnetic film 9, the magneto-optical recording film 10, and the protective film 7 were formed as films to have the following film thicknesses by means of continuous sputtering by using a magnetron sputtering apparatus respectively. The dielectric film 3 had a thickness of 60 nm, the auxiliary magnetic film 8 had a thickness of 60 nm, the non-magnetic film 9 had a thickness of 20 nm, the magneto-optical recording film 10 had a thickness of 50 nm, and the protective film 7 had a thickness of 60 nm.

The composition of TbFeCo for constructing the magneto-optical recording film 10 is $Tb_{21}Fe_{66}Co_{13}$ as represented by an atomic % ratio to exhibit a characteristic such that the magnetization component of the transition metal is more dominant than the magnetization component of the rare earth at a temperature from room temperature to the Curie temperature $T_{CO}=270°$ C. On the other hand, the composition of GdFeCo for constructing the auxiliary magnetic film 8 is $Gd_{28}Fe_{53}Co_{19}$ as represented by an atomic % ratio to exhibit, as a single layer film, a temperature-dependent characteristic of the Kerr rotation angle as shown in FIG. 2.

Figure 2:
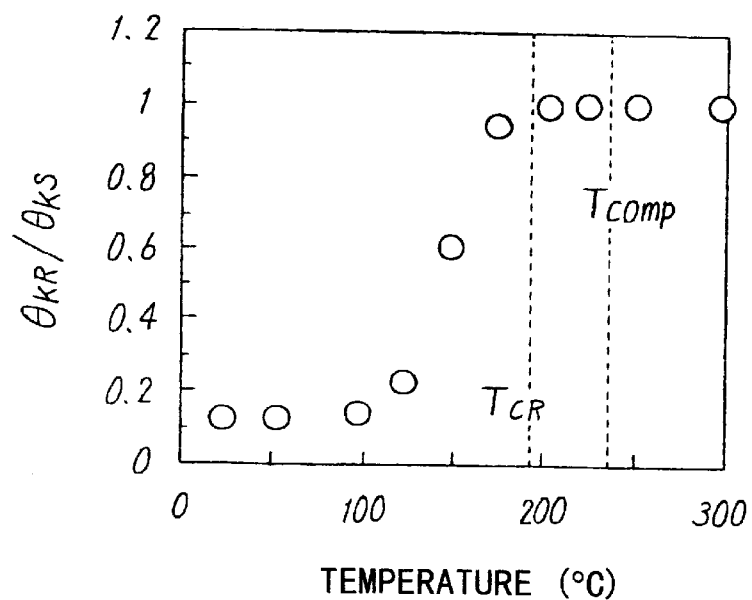
FIG. 2 shows a graph illustrating a temperature-dependent characteristic of the Kerr effect of an auxiliary magnetic film of the magneto-optical recording medium produced in the first embodiment of the present invention.

With reference to FIG. 2, the horizontal axis denotes the temperature, and the vertical axis denotes the ratio $\theta KR/\theta KS$ of the remaining Kerr rotation angle $\theta KR$ to the saturated Kerr rotation angle $\theta KS$ of the GdFeCo auxiliary magnetic film 8 determined from the hysteresis of the Kerr rotation angle with respect to the temperature. According to this graph, the critical temperature $T_{CR}$, at which the auxiliary magnetic film 8 is converted from the in-plane magnetizable film into the perpendicularly magnetizable film, is about 200° C. The auxiliary magnetic film 8 has a Curie temperature Tc of not less than 300° C., and it has a compensation temperature $T_{comp}$ between room temperature $T_{room}$ and the Curie temperature, in which $T_{comp}$ is about 230° C. The following relationship is given concerning the critical temperature $T_{CR}$, the compensation temperature $T_{comp}$, and the Curie temperature Tc of the auxiliary magnetic film 8, and the Curie temperature $T_{CO}$ of the magneto-optical recording film 10. $T_{room}<T_{CR}<T_{comp}<T_{CO}<Tc$. By satisfying this condition, it is extremely easy to perform reproduction by using the power-modulated pulse light beam as described later on.

The reproducing method as explained in the description of the principle of the present invention with reference to FIG. 19 is executed by using the magneto-optical recording medium 70 having the structure as described above.

[Preparatory experiment for determining intensity of reproducing laser pulse]

In the reproducing method of the present invention, the recording magnetic domain is magnified to perform reproduction by using the pulse light beam obtained by power-modulating the laser power to have the high power Pr2 and the low power Pr1. Accordingly, a preparatory experiment is firstly performed to determine the optimum laser powers of Pr2 and Pr1 for reproducing data recorded on the magneto-optical recording medium 70. In this preparatory experiment, a magneto-optical drive comprising an optical system having a laser beam wavelength of 680 nm and a numerical aperture of 0.55 is used to radiate recording and reproducing laser beams onto the side of the substrate 1 (side of the auxiliary magnetic film 8). A continuous light beam is used as the reproducing laser beam as described later on. The reproducing laser beam is changed to have various powers to observe respective reproduced signal waveforms.

A laser beam having a recording power of 4.5 mW was modulated with a cycle of 640 ns and a pulse width of 213 ns at a linear velocity of 5.0 m/s for a track disposed at a radius of 40 mm of the previously initialized magneto-optical recording medium 70 to perform optical modulation recording while applying a recording magnetic field of 500 Oe. Accordingly, recording marks each having a length of about 1.6 μm were continuously recorded at a pitch of 3.2 μm on the track.

Subsequently, the track recorded with the recording marks was subjected to reproduction with continuous light beams having various reproducing powers Pr. In order to determine the optimum modulation condition for the reproducing power, the value of the power Pr of the continuous light beam was changed to be at five levels, i.e., Pr=1.0 mW, 1.5 mW, 1.9 mW, 2.0 mW, and 2.1 mW to determine reproduced signals respectively. No magnetic field was actively applied to the magneto-optical recording medium 70 during the reproduction. However, a leakage magnetic field (about 80 Oe), which leaked from the actuator of the optical head, was generated in the recording direction.

Figure 3A:
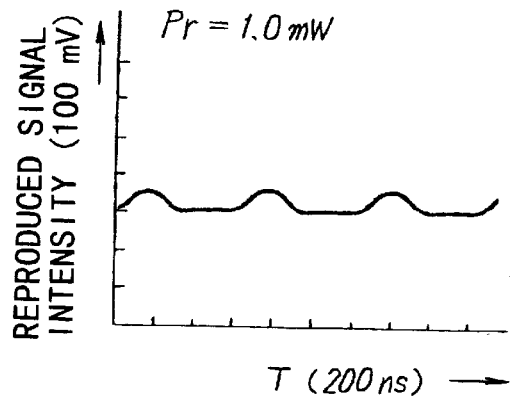
FIGS. 3A to 3E show graphs illustrating reproduced signal waveforms observed on an oscilloscope when the magneto-optical recording medium obtained in the first embodiment of the present invention is subjected to reproduction with continuous light beams having various reproducing powers.
Figure 3B:
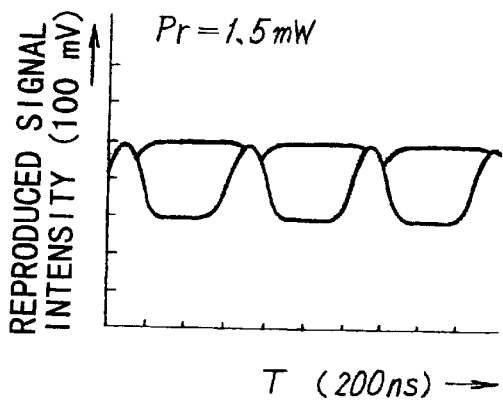

FIGS. 3A to 3E show reproduced signal waveforms obtained when the recording track of the magneto-optical recording medium 70 was subjected to reproduction with the respective reproducing powers Pr as described above. In this experiment, the reproduced signal waveform itself was subjected to triggering to observe the waveform by using an oscilloscope. FIG. 3A shows a reproduced signal waveform obtained for the reproducing light power Pr=1.0 mW, from which it is understood that the reproduced signal arises corresponding to the pattern of the recording mark. On the graph, the base line indicates an erased state, and the rising peak signal indicates a recording state. The amplitude between the recording state and the erased state was 50 mV. When the reproducing light power was increased to Pr=1.5 mW, the signal amplitude was increased to about 200 mV as shown in FIG. 3B. According to the waveform shown in FIG. 3B, it is understood that the adjoining peak signals are continuous on the side of the recording state in a part of the area of the waveform.

Figure 3C:
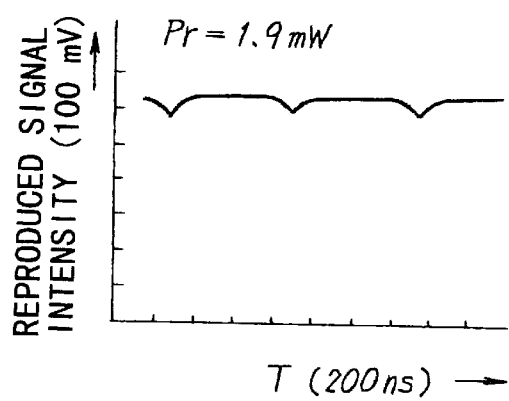
Figure 3D:
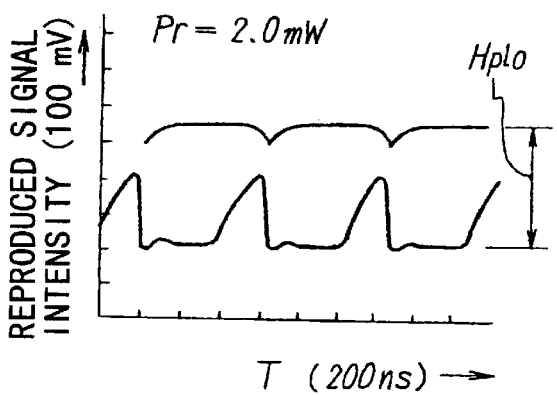
Figure 3E:
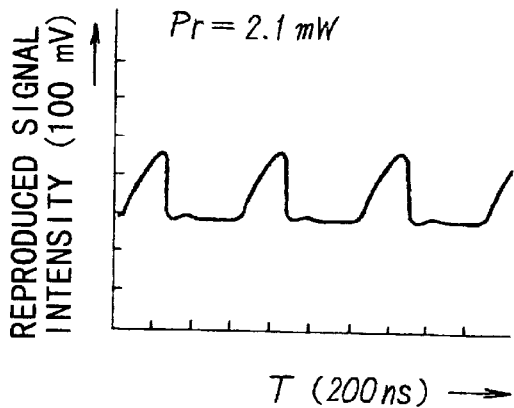

FIG. 3C shows a reproduced signal waveform for the reproducing power of Pr=1.9 mW, indicating that the peak signals are completely continuous on the side of the recording state (at an upper portion in the drawing). This result demonstrates that the magnetic domain is magnified in the auxiliary magnetic film as described later on, and the magnified magnetic domain undergoes movement on the track in accordance with the scanning for the track with the reproducing light spot. When the reproducing light power is further increased to Pr=2.0 mW, the peak signals having been continuous begin to be discontinuous as shown in FIG. 3D. In this case, the amplitude $H_{plo}$ between the connected portion of the peak signal and the base line was about 350 mV. When the reproducing light power was further increased up to Pr=2.1 mW, the peak signal is completely discontinuous as shown in FIG. 3E, giving a waveform corresponding to the recording mark pattern. In FIG. 3E, the amplitude between the recording state and the erased state was 200 mV.

Figure 4A:
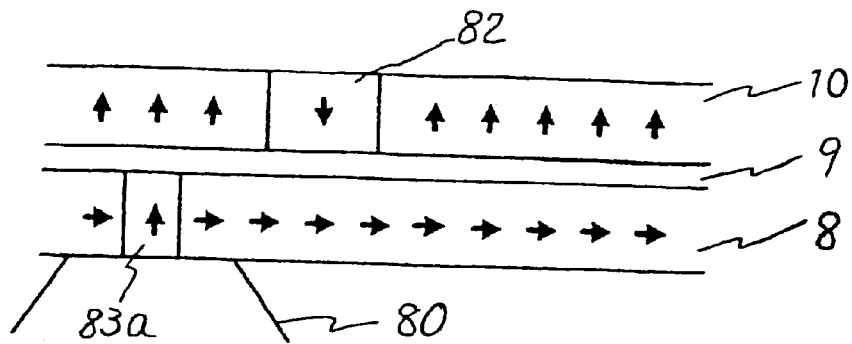
FIGS. 4A to 4C conceptually illustrate magnetization states of the respective layers of the magneto-optical recording medium when the signal waveform shown in FIG. 3A is obtained.
Figure 4B:
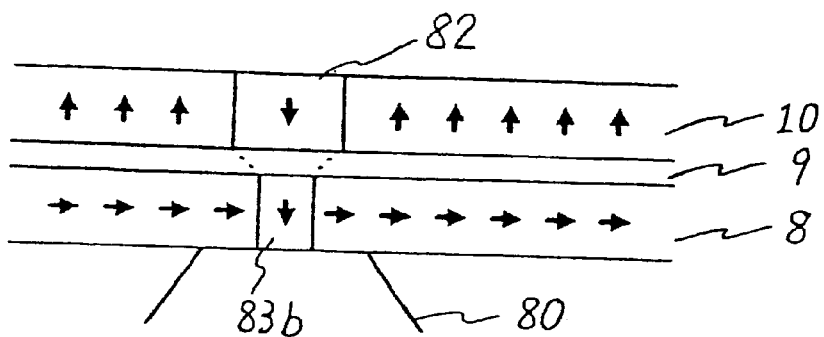

The magnetization states of the auxiliary magnetic film 8 and the magneto-optical recording film 10 stacked with the non-magnetic film 9 intervening therebetween, which are given when the reproduced signal waveforms shown in FIGS. 3A to 3E are obtained, will be explained with reference to conceptual drawings shown in FIGS. 4 to 6. FIG. 4 shows a situation in which the signal waveform shown in FIG. 3A is obtained (reproducing light power Pr=1.0 mW), illustrating the relationship between the reproducing light spot 80 and the directions of magnetization of the auxiliary magnetic film 8 and the magneto-optical recording film 10 irradiated with the reproducing light spot 80. At first, the auxiliary magnetic film 8, which is irradiated with the reproducing light spot 80 as shown in FIG. 4A, exhibits perpendicular magnetization in an area in which its temperature is raised to be not less than the critical temperature $T_{CR}$. The magnetization of the magneto-optical recording film 10 is transferred to an area 83a of the auxiliary magnetic film 83a by the aid of the magnetostatic coupling. As shown in FIG. 4B, when the reproducing light spot 80 is disposed just under a magnetic domain (recording magnetic domain) 82 in which the magnetization is directed in the recording direction, the magnetization of the recording magnetic domain 82 is transferred to the auxiliary magnetic film 8 by the aid of the magnetostatic coupling. In this case, the reproducing light power Pr is 1.0 mW which is low. Therefore, only the central portion of the auxiliary magnetic film 8 within the light spot 80, i.e., only the area 83b has the temperature which exceeds the critical temperature $T_{CR}$. The transferred area 83b of the auxiliary magnetic film 8 is not magnified to be larger than the width of the recording magnetic domain 82. Accordingly, as shown in FIG. 3A, the reproduced signal intensity is small. When the reproducing light spot 80 passes over the recording magnetic domain 82, a transferred area 83c has the same direction of magnetization as that of the magnetic domain in the magneto-optical recording film 10 located just thereover, as a result of transfer from the magnetic domain in the magneto-optical recording film 10 located just thereover.

Figure 5A:
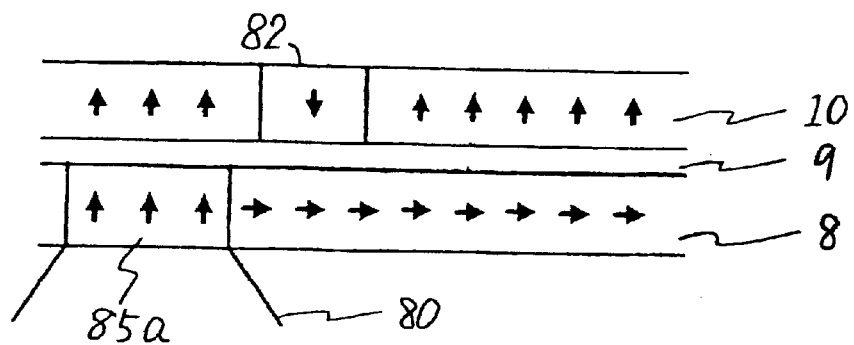
FIGS. 5A to 5C conceptually illustrate magnetization states of the respective layers of the magneto-optical recording medium when the signal waveform shown in FIG. 3C is obtained.
Figure 5B:
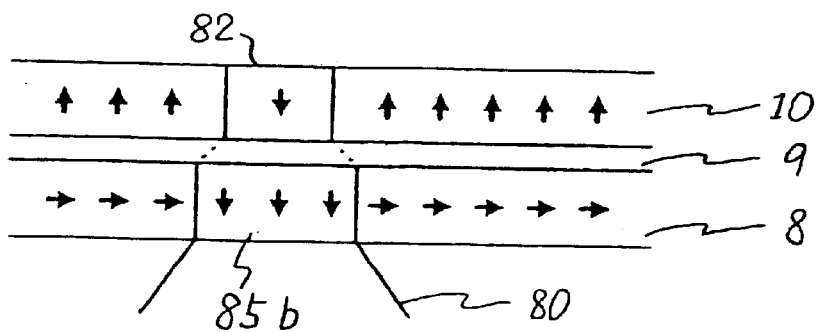

FIG. 5 shows a situation in which the signal waveform shown in FIG. 3C is obtained (reproducing light power Pr=1.9 mW), illustrating the relationship between the reproducing light spot 80 and the directions of magnetization of the auxiliary magnetic film 8 and the magneto-optical recording film 10 irradiated with the reproducing light spot 80. In this case, the reproducing light power is 1.9 mw which is relatively large. Therefore, as shown in FIG. 5A, an entire area 85a within the spot in the auxiliary magnetic film 8 irradiated with the reproducing light spot 80 has a temperature raised to be not less than the critical temperature $T_{CR}$, giving perpendicular magnetization. The magnetic domain in the magneto-optical recording film 10 is transferred to the area 85b by the aid of the magnetostatic coupling effected by the magneto-optical recording film 10. When the reproducing light spot 80 is subjected to scanning to locate the reproducing light spot 80 just under the recording magnetic domain 82 as shown in FIG. 5B, the magnetization of the recording magnetic domain 82 is transferred. In this case, the area 85b of the auxiliary magnetic film 8, which is heated to a temperature not less than the critical temperature $T_{CR}$, has its width larger than the recording magnetic domain 82. Accordingly, the recording magnetic domain 82 is transferred while being magnified in the auxiliary magnetic film 8. The large signal waveform is obtained owing to the magnification of the magnetic domain. After the reproducing light spot 80 passes over the recording magnetic domain 82, the area 85c maintains the same magnetization state as that of the area 85b. Therefore, the waveform, in which the reproduced signal peaks are continuous as shown in FIG. 3C, is obtained.

Figure 4C:
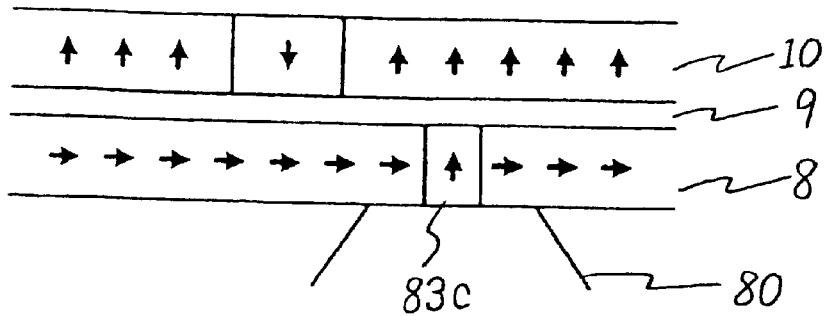
Figure 5C:
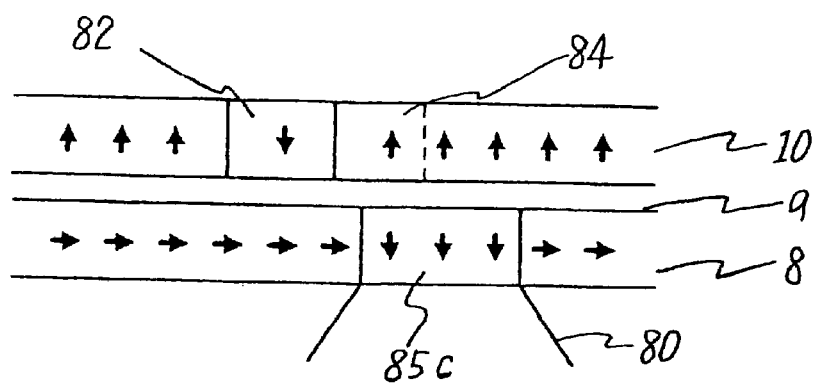

In the case of the situation shown in FIG. 5, the area 85c maintains the same magnetization state as that of the area 85b after the reproducing light spot 80 passes over the recording magnetic domain 82. A phenomenon arises, in which the light spot draws the recording magnetic domain which is transferred to the auxiliary magnetic layer to be subjected to the magnetic domain transfer and the magnetic domain magnification. The reason for this phenomenon is considered to be as follows. The temperature of the auxiliary magnetic layer 8 is raised to be not less than the critical temperature by being irradiated with the reproducing laser beam, and the auxiliary magnetic layer 8 is converted into the perpendicularly magnetizable film having the coercive force Hc in the perpendicular direction. During the reproduction, the auxiliary magnetic film 8 is applied with the external magnetic field Hex (in the recording direction, i.e., in the downward direction in this embodiment) which is caused by the leakage magnetic field, for example, from the actuator of the optical head, and the static magnetic field Hs which is generated from the magnetization of the magneto-optical recording film 10 at a temperature not less than the critical temperature of the auxiliary magnetic film 8. The applied magnitude is Hex+Hs (when the magnetization of the recording magnetic domain is in the downward direction) or Hex−Hs (when the magnetization of the recording magnetic domain is in the upward direction) depending on the direction of the magnetization of the magneto-optical recording film 10. If the absolute value of Hc is larger than the absolute value of (Hex+Hs) or the absolute value of (Hex−Hs) concerning the magnitude of the combined magnetic field of the external magnetic field Hex and the static magnetic field Hs and the coercive force Hc of the auxiliary magnetic film 8, the magnetization formed in the auxiliary magnetic film 8 is maintained as it is. As shown in FIG. 5C, the magnetic domain, which is once transferred to the auxiliary magnetic film, does not cause reinversion even when the reproducing spot proceeds to the area in which no recording magnetic domain exits in the magneto-optical recording film 10. Hc is the coercive force in the perpendicular direction, obtained when the auxiliary magnetic film 8 is in the perpendicular magnetization state. In the case of the situation shown in FIG. 4, Hc of the auxiliary magnetic film is lower than that in FIG. 5, because the temperature of the auxiliary magnetic layer subjected to transfer by the low reproducing power is relatively low. Accordingly, the magnetic domain transferred to the auxiliary magnetic film 8 causes reinversion when the reproducing spot proceeds to the area in which no recording magnetic domain exists in the magneto-optical recording film 10 (FIG. 4C).

Figure 6A:
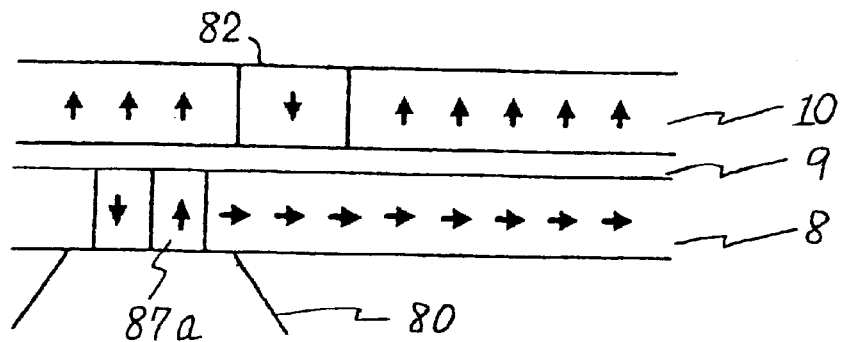
FIGS. 6A to 6C conceptually illustrate magnetization states of the respective layers of the magneto-optical 34 A recording medium when the signal waveform shown in FIG. 3E is obtained.
Figure 6B:
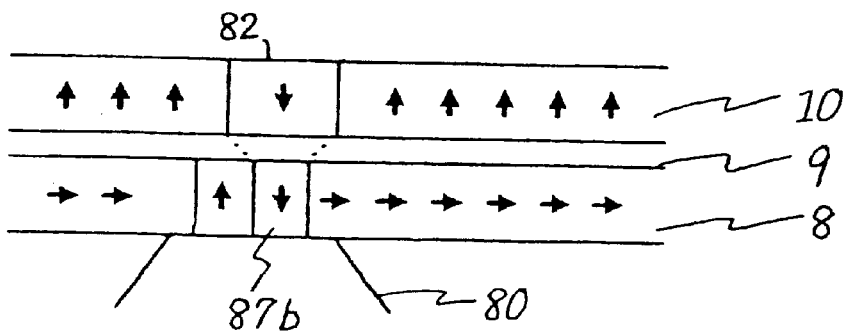
Figure 6C:
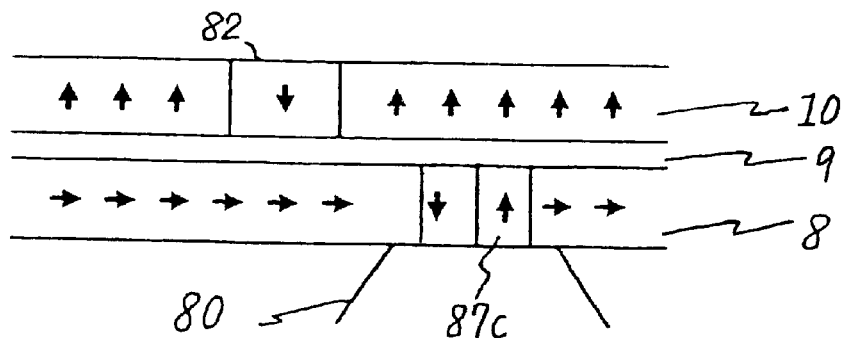

FIG. 6 shows a situation in which the signal waveform shown in FIG. 3E is obtained (reproducing light power Pr=2.1 mW), illustrating the relationship between the reproducing light spot 80 and the directions of magnetization of the auxiliary magnetic film 8 and the magneto-optical recording film 10 irradiated with the reproducing light spot 80. In this case, the reproducing light power is 2.1 mW which is relatively large. Therefore, a front portion area 87a within the spot in the auxiliary magnetic film 8 irradiated with the reproducing light spot 80 has a temperature raised to be not less than the critical temperature TCR, giving perpendicular magnetization, and it is subjected to magnetic domain transfer of the magnetic recording layer 10 located just thereunder. However, the central portion and the back portion within the spot are heated intensely as compared with the front portion to exceed the compensation temperature Tcomp of the auxiliary magnetic film 8. Therefore, it is considered that a state is given, in which the magnetization is inverted (detailed reason for inversion of magnetization will be described later on in the specified embodiment of the second reproducing method). Accordingly, as shown in FIG. 6A, only the area 87a, which is disposed at the front portion of the auxiliary magnetic film within the reproducing light spot 80, has the magnetization in the upward direction, and the central portion and the back end portion have the magnetization in the downward direction.

Subsequently, when the track is subjected to scanning with the reproducing light beam so that the spot 80 is located just under the recording magnetic domain 82, the magnetization of the recording magnetic domain 82 is transferred to only the area 87b having the relatively low temperature disposed at the front portion of the auxiliary magnetic film 8. Therefore, no magnetic domain magnification occurs. It is impossible to obtain the signal as shown in FIG. 3C having the large reproduced signal intensity. When the reproducing light spot 80 passes over the recording magnetic domain 82, the transfer area 87c includes the magnetization having the same direction as that of the magnetic domain in the magneto-optical recording film 10 disposed just thereover and the inverted magnetic domain thereof in a mixed manner by the aid of the magnetostatic coupling effected by the magneto-optical recording film 10.

In the case of the situation shown in FIG. 5 (FIG. 3C), the reproduced signal intensity is increased, because the magnetic domain magnification occurs in the auxiliary magnetic film 8 as described above. The magnetic domain 85b, which is magnified from the recording magnetic domain 82, is moved together with the reproducing light spot 80 while being magnified. However, in the situation shown in FIG. 5C, when the center of the reproducing light spot 80 is located just under a magnetic domain 84 adjacent to the recording magnetic domain 82, it is necessary to avoid the phenomenon in which the magnified magnetic domain is drawn by the light spot, in order to reproduce the magnetization of the magnetic domain 84 by the aid of the auxiliary magnetic layer 8. That is, it is necessary to erase the magnified magnetic domain 85c of the recording magnetic domain 82 and transfer the magnetization of the magnetic domain 84 to the auxiliary magnetic layer 8 followed by magnification.

On the other hand, as shown in FIG. 4 (corresponding to FIG. 3A) and FIG. 6 (corresponding to FIG. 3E) respectively, when the reproducing power Pr is relatively small (reproducing light power Pr=1.0 mW), and when the reproducing power Pr is relatively large (reproducing light power Pr=2.1 mW), the magnetic domain 83b (87b) transferred from the recording magnetic domain 82 is extinguished after the reproducing light spot 80 passes over the recording magnetic domain 82. That is, the phenomenon, in which the magnified magnetic domain is drawn, does not take plate. Therefore, if the reproducing light beam to be used is a pulse light beam which is power-modulated at a reproducing clock cycle or at a cycle created by the multiplication of an integer and the reproduction clock between the reproducing light power Pr=1.9 mW at which the magnetic domain magnification occurs and the reproducing light power Pr=2.1 mW (or 1.0 mW) at which the magnetic domain magnification does not occur, the magnetic domain can be magnified, and then the magnified magnetic domain can be extinguished when the center of the reproducing light spot is moved from the recording magnetic domain in the magneto-optical recording film onto the adjacent recording magnetic domain.

According to the result of the preparatory experiment described above, if the reproducing laser beam is applied as the pulse light beam which is intensity-modulated between Pr=1.9 mW as shown in FIG. 3C and Pr=2.1 mW as shown in FIG. 3E, the reproduced signal is detected as a difference between the reproduced signal intensities obtained as shown in FIG. 3C and FIG. 3E. The difference is considered to correspond to $H_{plo}$=350 mV shown in FIG. 3D, suggesting that the reproduction can be performed with an amplitude which is larger than the amplitudes obtained in FIGS. 3A and 3E. Therefore, in the following experiment in reproduction based on the use of the reproducing light pulse, the high power Pr2 is set to be Pr2=2.1 mW, and the low power Pr1 is set to be Pr1=1.9 mW.

[First reproducing method on magneto-optical recording medium with power-modulated pulse light beam]

After the magneto-optical recording medium 70 produced in this embodiment was initialized, a laser beam having a recording power of 6.3 mW was modulated with a cycle of 320 ns and a pulse width of 53.3 ns to perform optical modulation recording with a recording magnetic field of 500 Oe, at a linear velocity of 5.0 m/s for a track disposed at a radius of 40 mm. This corresponds to a condition in which recording marks of about 1.6 μm were continuously recorded at a pitch of 3.2 μm.

The recording track of the magneto-optical recording medium 70 thus subjected to the recording is irradiated with the power-modulated pulse laser having the reproducing light laser powers of Pr2=2.1 mW and Pr1=1.9 mW as determined by the preparatory experiment so that reproduction is performed. As shown in FIG. 7, the reproducing laser pulse was adjusted to give Pr2=2.1 mW in a pulse width of 10 ns starting from the front end of the recording mark, and Pr1=1.9 mW in a pulse width of 150 ns following thereafter. No magnetic field was actively applied during the reproduction. However, a leakage magnetic field (about 80 Oe) was generated in the recording direction from the actuator of the optical head.

Figure 8:
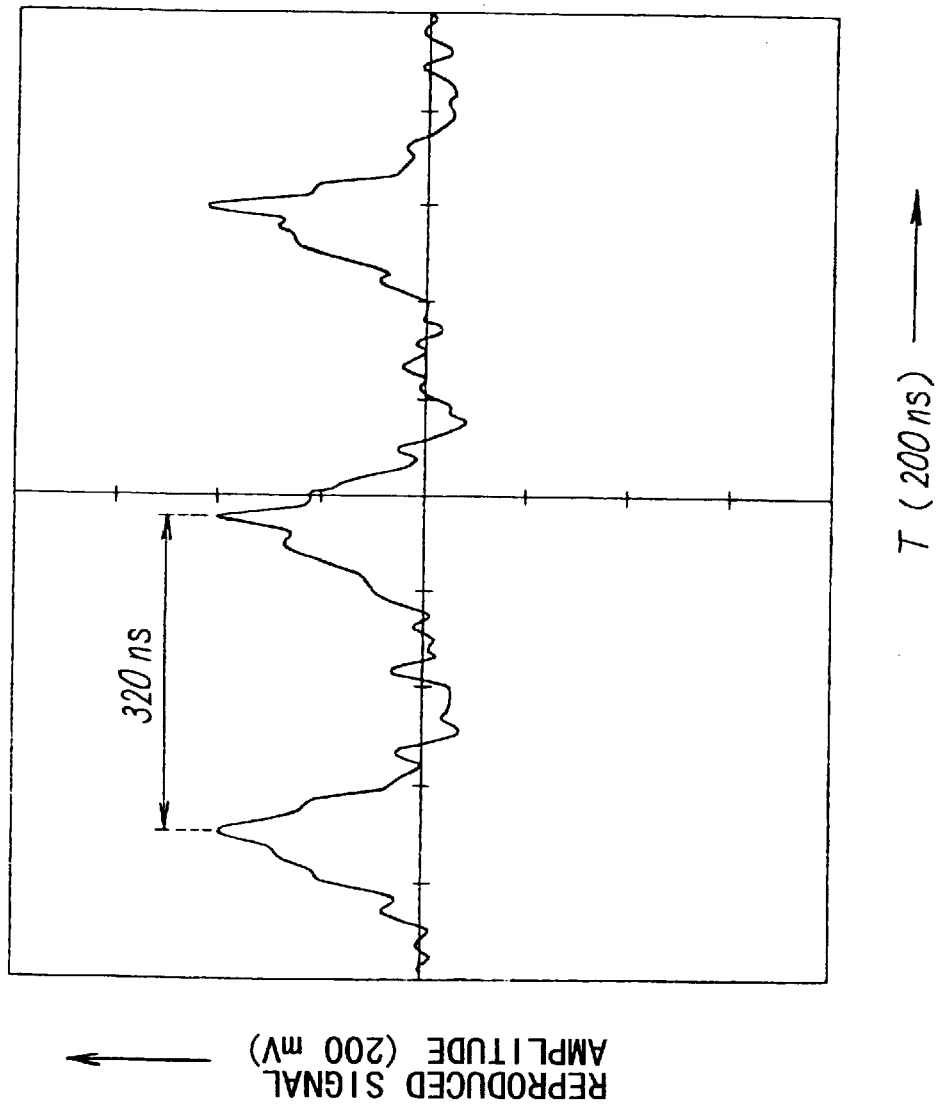
FIG. 8 shows a graph illustrating a reproduced signal waveform obtained by performing reproduction by using the reproducing pulse light beam shown in FIG. 7.

An obtained reproduced signal waveform is shown in FIG. 8. The obtained reproduced signal had an amplitude of about 220 mV corresponding to the recording marks. When the mark pattern recorded under the same condition was subjected to reproduction with continuous light beams having constant reproducing powers of Pr=1.0 mW and Pr=2.1 mW, the amplitudes were 100 mV and 170 mV respectively. According to these results, it is understood that the reproduction with the reproducing light beam which is power-modulated to have the pulse form makes it possible to magnify and transfer the recording magnetic domain in a form of being synchronized with the reproducing clock and extinguish the magnified magnetic domain immediately thereafter, and the reproduction can be performed with higher C/N when the magnetic domain is magnified.

In this embodiment, the respective pulse laser intensities, i.e., the high power Pr2=2.1 mW and the low power Pr1=1.9 mW were selected. The low power pulse was used to generate the magnified magnetic domain, and the high power pulse was used to extinguish the magnified magnetic domain. However, the high power pulse may be Pr2=1.9 mW to generate the magnified magnetic domain, and the low power pulse may be Pr1=1.0 mW to extinguish the magnified magnetic domain. The illustrative case shown in FIG. 19 used to explain the principle is representative of the latter case. The pulse width ratio between the high power pulse and the low power pulse, i.e., the duty is not limited to those shown in FIGS. 19 and 7. The duty may be appropriately changed in order to obtain an enhanced reproduced signal.

The magneto-optical recording medium produced in the first embodiment may comprise a heat control layer having an appropriate heat conductivity disposed on the protective film of the magneto-optical recording medium, in order to give a desired shape for the temperature profile of the medium obtained when the reproducing light beam is radiated, or in order to decrease the linear velocity dependency of the temperature profile. Further, in order to obtain a better reproducing CN ratio, it is also allowable to add, between the dielectric film 3 and the auxiliary magnetic film 8, a reproducing magnetic film which is a perpendicularly magnetizable film at a temperature not less than room temperature in which the Kerr rotation angle θk is not less than θk of the auxiliary magnetic film at the maximum arrival temperature of the medium when the reproducing light beam is radiated.

Second Embodiment

[Second reproducing method on magneto-optical recording medium with power-modulated pulse light beam]

In the foregoing embodiment of the reproducing method, the leakage magnetic field generated from the magnetic head during reproduction is applied to the magneto-optical recording medium. In this embodiment, reproduction is performed while actively applying a DC magnetic field in the same direction as the magnetization direction of the recording magnetic domain. Reproduction was performed in this embodiment by modulating the laser beam intensity as well in order to realize magnification and extinguishment of the transferred magnetic domain.

Figure 9:
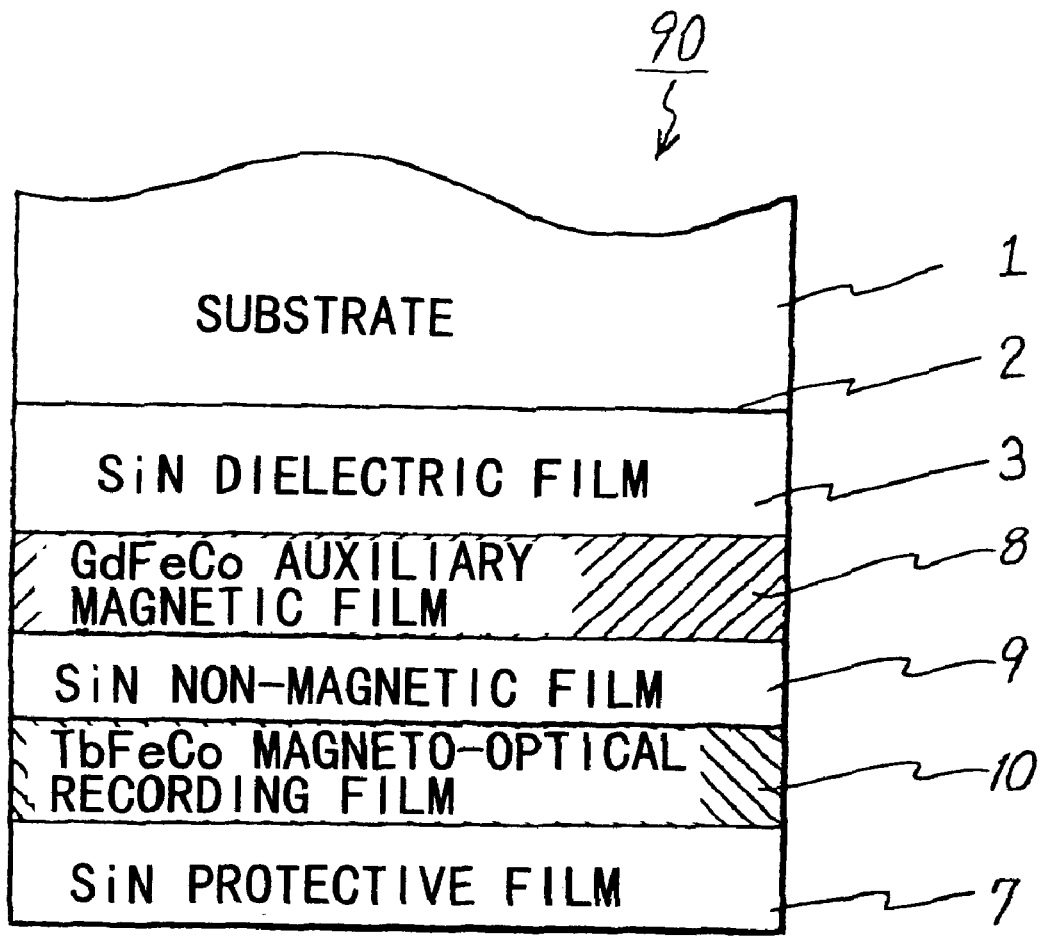
FIG. 9 conceptually shows a stacked structure of a magneto-optical recording medium to be used for a second reproducing method according to the present invention.

At first, explanation will be made for a magneto-optical disk used in this embodiment. As shown in FIG. 9, the magneto-optical disk 90 comprises, on a polycarbonate substrate 1 in a stacked manner, a dielectric layer 3 composed of SiN, a reproducing layer (auxiliary magnetic film) 8 composed of a GdFeCo alloy, a non-magnetic layer 9 composed of SiN, a recording layer (magneto-optical recording film) 10 composed of a TbFeCo alloy, and a protective layer 7 composed of SiN. The TbFeCo recording layer 10 and the GdFeCo reproducing layer 8 are coupled magnetostatically with the non-magnetic layer 9 interposed therebetween. The GdFeCo reproducing layer 8 is a magnetic film which is an in-plane magnetizable film at room temperature and which is changed into a perpendicularly magnetizable film when the temperature exceeds a critical temperature Tcr. The GdFeCo reproducing layer 8 used in this embodiment has a critical temperature Tcr of 175° C. and a Curie temperature Tc of 340° C. The GdFeCo reproducing layer 8 has a compensation temperature Tcomp=240° C. between the critical temperature Tcr and the Curie temperature Tc. The TbFeCo recording layer 10 has its Curie temperature Tco of 270° C. and its compensation temperature Tcomp' of not more than room temperature. That is, there is given the relationship of Troom<Tcr<Tcomp<Tco<Tc. The relationship concerning the temperatures has been explained with reference to FIG. 11.

When the reproduction is performed for the recording signal recorded in the recording layer 10 of the magneto-optical recording medium 90 as described above, the reproducing power is modulated to have the two powers in synchronization with the reproducing clock or the integral multiple thereof (recording clock or a cycle created by the multiplication of an integer and the reproducing clock), as explained concerning the principle of the reproducing method of the present invention. The reduction and the extinguishment of the magnified magnetic domain may occur at any one of the low power and the high power as described above. However, in this embodiment, the reproducing light beam to transfer and magnify the magnetic domain was modulated to have the low power, and the reproducing light beam to reduce or extinguish the magnified magnetic domain was modulated to have the high power. The power levels are applied when the recording track is subjected to scanning while irradiating the magneto-optical disk with the reproducing light beam.

An optical head having a wavelength of 680 nm and a numerical aperture of the lens of 0.55 was used as a light source for performing recording and reproduction. Recording was performed on the magneto-optical disk 90 shown in FIG. 9 by using the light pulse intensity modulation method. Recording was performed under a condition of a linear velocity of 5 m/s, a recording cycle of 320 ns, a recording laser power of 7.5 mW, a pulse width of 53.3 ns, and a recording magnetic field of 500 Oe. Recording magnetic domains of 0.8 $\mu$m were subjected to recording at intervals of 0.8 $\mu$m corresponding to data including, for example, 1 and 0. The magnetic domains subjected to recording are shown in FIG. 10(*a*) together with the recording signal.

The recording magnetic domains were subjected to reproduction under the following reproducing condition. The linear velocity was 5.0 m/s. The reproducing laser power was modulated to have two power levels of 1.5 mW as the low power Pr1 to magnify the magnetic domain, and 3.5 mW as the high power Pr2 to reduce (or extinguish) the magnetic domain. A timing signal for the reproducing light power is shown in FIG. 10(*b*). The modulation cycle for the reproducing power was 160 ns. Radiation was performed for 150 ns at the low power Pr1, and radiation was performed for 10 ns at the high power Pr2. A constant direct current magnetic field was used as the reproducing magnetic field, which was applied at about 80 Oe in the recording direction. This magnetic field may be substituted with the leakage magnetic field from the objective lens actuator as in the first reproducing method (first embodiment).

Figure 10:
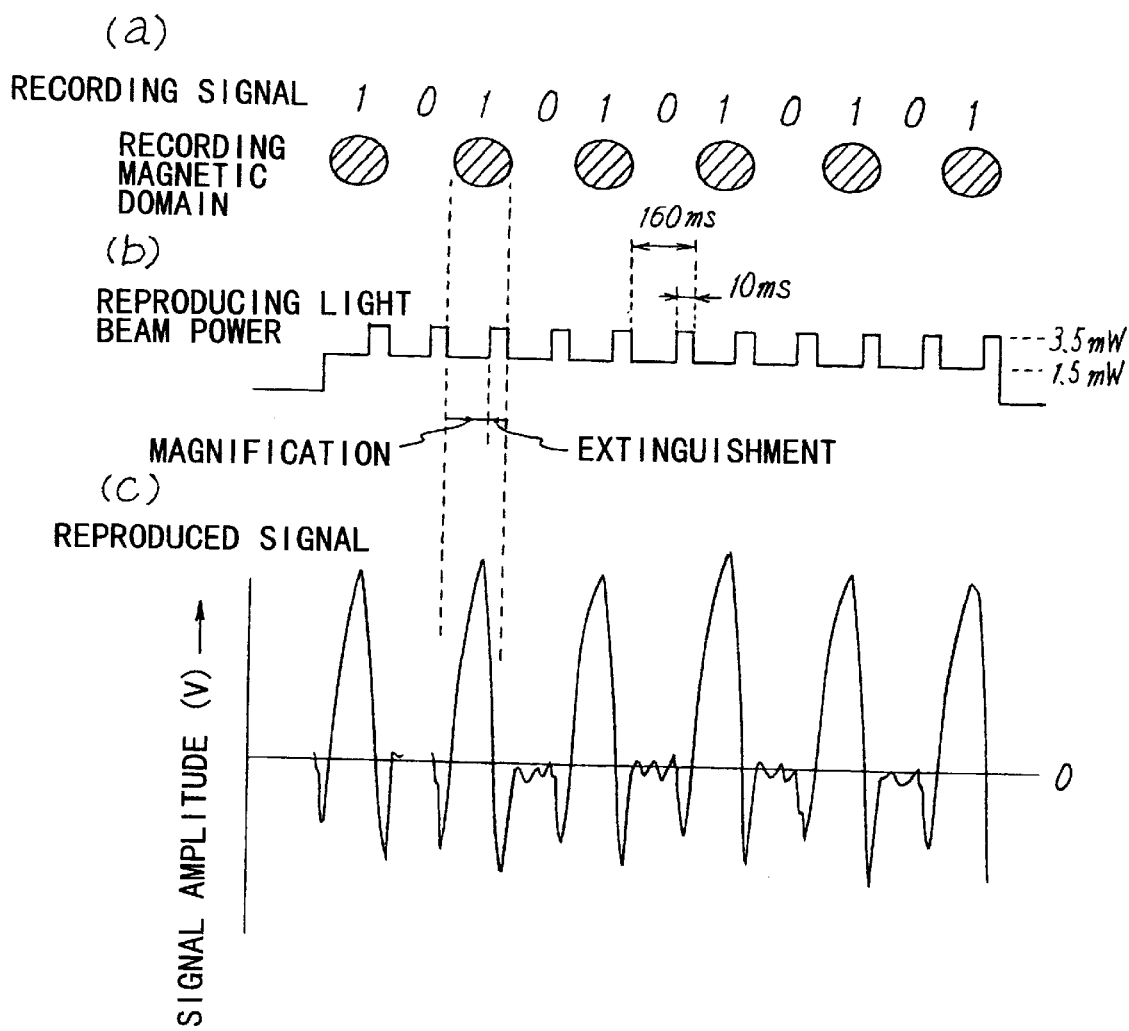
FIG. 10 shows a timing chart illustrating the principle of the reproducing method on the magneto-optical recording medium according to the present invention.

FIG. 10(*c*) shows an obtained reproduced signal waveform. It is understood from this reproduced signal waveform that the signal is enhanced only at portions at which the recording magnetic domain exists, and the signal is not enhanced at portions at which the recording magnetic domain does not exist. This fact means that the recording magnetic domain is transferred and magnified in the reproducing layer only when the reproducing light beam makes scanning for the portion of the track at which the recording magnetic domain exists. The reproduced signal was obtained in accordance with the magnetically induced super resolution mode. That is, the reproduced signal was amplified to have the magnitude which was about 1.5 times the reproduced signal obtained by reproduction without magnifying the magnetic domain subjected to the magnetic domain transfer. The amplifying effect on the reproduced signal was remarkably effective for further minute recording magnetic domains. Even when minute magnetic domains of not more than 0.4 $\mu$m were subjected to recording, it was possible to obtain a reproduced signal output of 80% (ratio to the saturated amplitude) with respect to the saturated amplitude (difference between the reproduced signal obtained when all magnetization in the reproducing layer was in the downward direction and the reproduced signal obtained when all magnetization in the reproducing layer was in the upward direction).

Figure 11:
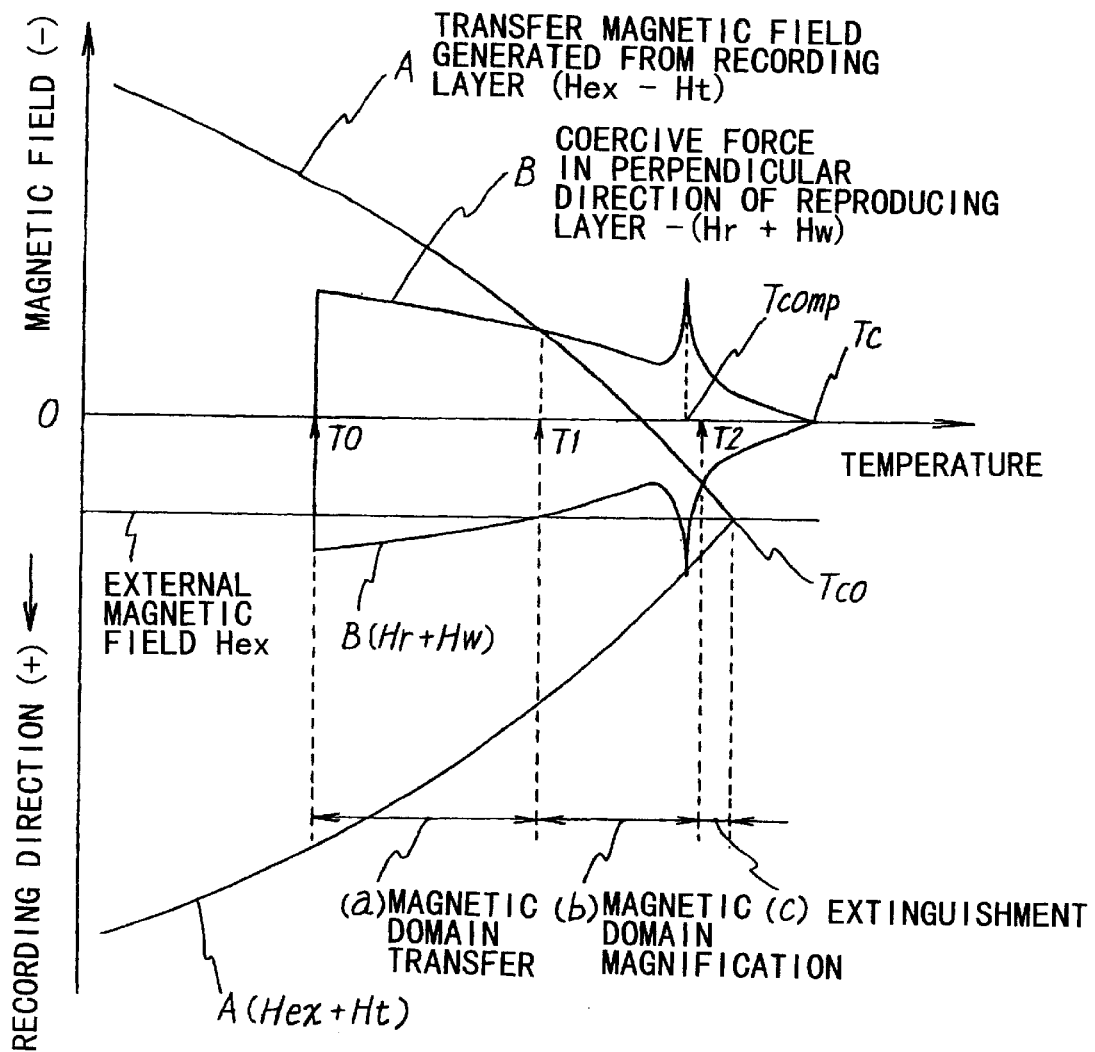
FIG. 11 shows the magnetic temperature characteristic concerning the magneto-optical recording layer and the magneto-optical reproducing layer of the magneto-optical recording medium according to the present invention.
Figure 13A:
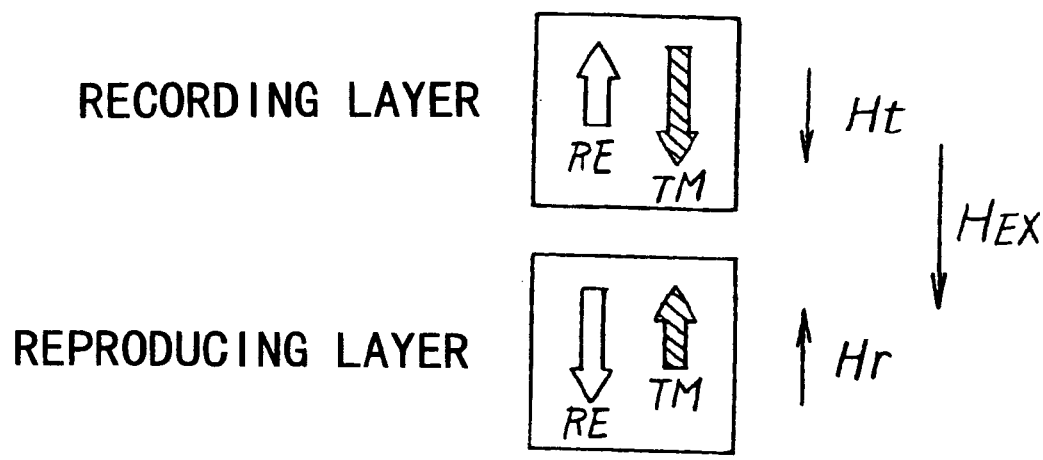
FIG. 13A illustrates the principle of the extinguishment of the magnetic domain, showing the sub-lattice magnetization of the reproducing layer at a temperature less than the compensation temperature.
Figure 13B:
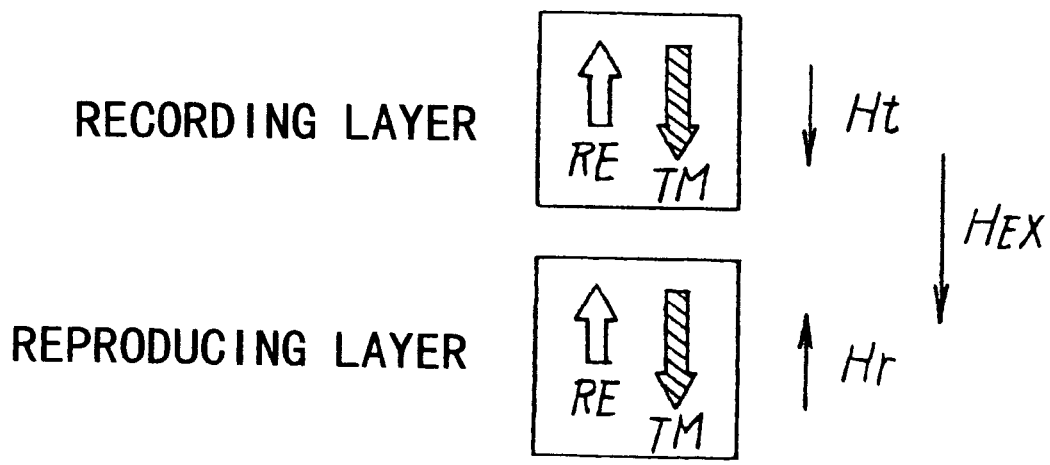
FIG. 13B illustrates the principle of the extinguishment of the magnetic domain, showing the sub-lattice magnetization of the reproducing layer at a temperature above the compensation temperature.

The reproducing condition in this embodiment may be explained as follows in relation to FIG. 11 used to explain the principle. That is, the reproducing layer is heated by the low power Pr1 of the power-modulated reproducing light beam to be in the temperature areas (areas (a) and (b)) shown in FIG. 11 in which the magnetic domain transfer and the magnetic domain magnification are caused, i.e., up to Tcr=175° C. to Tcomp=240° C. The recording layer is heated by the high power Pr2 to be in the temperature area (area (c)) shown in FIG. 11 in which the magnetic domain extinguishment is caused, i.e., from a temperature exceeding Tcomp (240° C.) to Tco=270° C. The direct current magnetic field of about 80 Oe applied in the recording direction allows the magnetic temperature curves A and B to be disposed so that the relationship as shown in FIG. 11 is given. That is, the relationship between the magnetic temperature characteristic of the magneto-optical disk used in this embodiment and the applied direct current magnetic field satisfies the following requirements (3) and (4). The requirements necessary for the reproducing method described in this embodiment will be enumerated below. The magnetic characteristics of the reproducing layer and the recording layer of the magneto-optical recording medium used in this embodiment satisfy the following requirements (1) and (2) as described above.

(1) The reproducing layer, which is magnetized in the film surface direction at least at room temperature, has the compensation temperature Tcomp between the Curie temperature Tco and the critical temperature Tcr to cause magnetization in the perpendicular direction.

(2) The Curie temperature Tco of the recording layer exists between the compensation temperature Tcomp of the reproducing layer and the Curie temperature Tco of the reproducing layer.

(3) The magnetic temperature curve A and the magnetic temperature curve B intersect at a point (T1) between room temperature and the compensation temperature Tcomp of the reproducing layer under the condition in which the external magnetic field Hex is applied in the recording direction.

(4) The magnetic temperature curve A and the magnetic temperature curve B intersect at a point (T2) between the compensation temperature Tcomp of the reproducing layer and the Curie temperature Tco of the recording layer.

In this embodiment, the foregoing requirements (1) to (4) are satisfied by constructing the magneto-optical disk with the specified materials shown in FIG. 9, and applying the DC magnetic field=80 Oe in the recording direction. However, arbitrary combinations may be used provided that the magneto-optical recording medium comprising the materials and the stacked structure and the magnitude of the external magnetic field applied during the reproduction are capable of satisfying the requirements (1) to (4). The direction of the DC magnetic field applied during the reproduction is not limited to the recording direction, which may be the erasing direction.

In the reproducing method of the present invention, the process of (a) magnetic domain transfer, (b) magnetic domain magnification, and (c) extinguishment of transferred magnetic domain is executed by modulating the reproducing light power intensity under the DC magnetic field. The period of time, in which the process is carried out, depends not only on the magnetic characteristics of the recording layer and the reproducing layer but also on the temperature rising velocity and the heat transfer velocity between the respective layers concerning, for example, the recording layer, the reproducing layer, the non-magnetic layer, the dielectric layer, and the protective layer, as well as other stackable magnetic layers, non-magnetic layers, and substrates. The velocities can be controlled by appropriately changing, for example, the stacked structure, the thickness, and the thermal conduction characteristics of the materials for constructing the layers. Accordingly, it is possible to respond to a desired reproducing access velocity.

It is preferable that the dielectric layer and the non-magnetic layer, which adjoin the reproducing layer (auxiliary magnetic layer), have appropriate degrees of thermal insulation properties. However, the degree of the thermal insulation property can be appropriately adjusted in relation to the thermal characteristics obtained by combining the access velocities upon recording and reproduction, the magnitude of the linear velocities upon recording and reproduction on the recording medium, and the thermal conduction characteristics of the reproducing layer and the recording layer.

The foregoing embodiment is illustrative of the structure in which the reproducing layer (auxiliary magnetic layer) of the magneto-optical recording medium is interposed by the dielectric layer and the non-magnetic layer. However, a magnetic member having magnetic anisotropy in the in-plane direction may be stacked in contact with the reproducing layer (auxiliary magnetic layer). It is desirable that the magnetic anisotropy in the in-plane direction is dominant in the magnetic member up to its Curie temperature, and the Curie temperature is approximately equal to the Curie temperature of the reproducing layer. When such a magnetic member is stacked in contact with the reproducing layer, it is possible to suppress occurrence of the Bloch line in the transferred magnetic domain during the reproduction, and it is possible to reduce the noise during the reproduction owing to its suppressing action. Those usable as materials for such a magnetic member include, for example, Pt—Co alloys such as Pt—Co alloys containing 25 atomic % of Co and GdFeCo alloys. Such a magnetic member may be stacked to make contact with any one of the upper and lower sides of the reproducing layer.

In the first and second embodiments, recording is performed by using the optical modulation system in which light intensity is modulated in conformity with the recording signal while applying the DC magnetic field. However, it is allowable to use any one of the magnetic field modulation recording system, the optical modulation recording system, and the optical magnetic field modulation system based on the use of the ordinary DC light beam.

Third Embodiment

[Third reproducing method on magneto-optical recording medium with power-modulated pulse light beam]

Reproduction is performed in this embodiment while actively applying a DC magnetic field in the same direction as the magnetization direction of the recording magnetic domain in the same manner as in the second embodiment. Reproduction was performed in this embodiment by modulating the laser beam intensity as well in order to realize magnification and extinguishment of the transferred magnetic domain.

Figure 14:
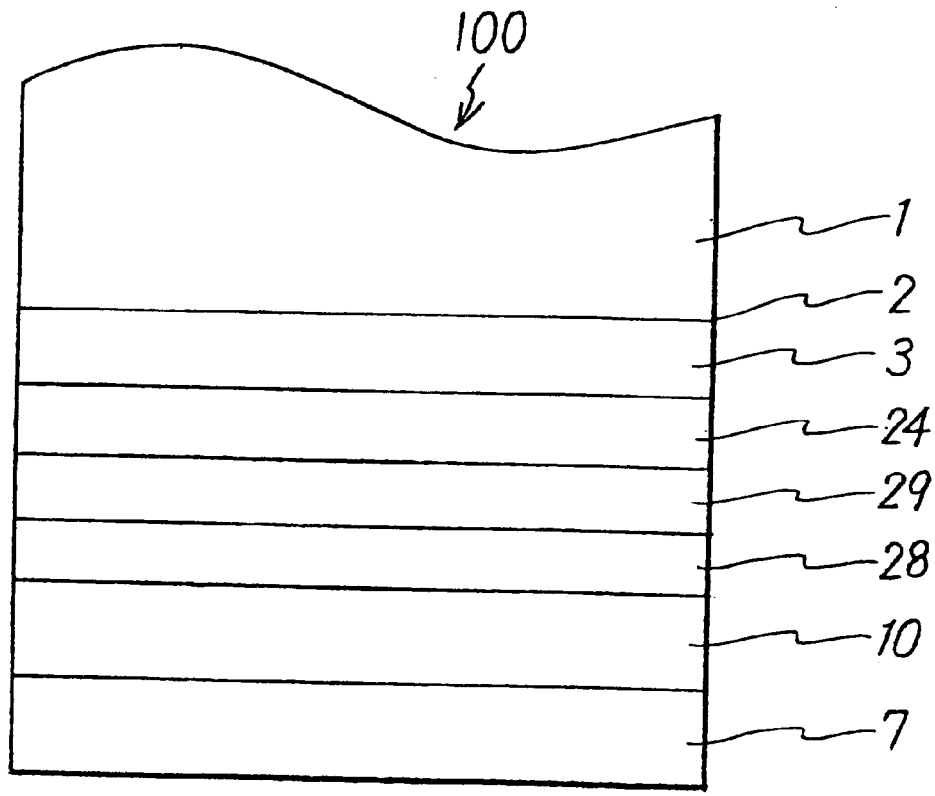
FIG. 14 shows a stacked structure of a magneto-optical recording medium produced in the third embodiment of the present invention.

At first, explanation will be made for a magneto-optical disk used in this embodiment. As shown in FIG. 14, the magneto-optical disk 100 comprises, in a stacked manner on a surface of a polycarbonate substrate 1 formed with a preformat pattern 2, a dielectric layer 3 composed of SiN, a reproducing layer (second auxiliary magnetic film) 24 composed of a GdFeCo alloy, a non-magnetic layer 29 composed of SiN, a magnetic layer (first auxiliary magnetic film) 28 composed of a GdFeCo alloy, a recording layer (magneto-optical recording film) 10 composed of a TbFeCo alloy, and a protective layer 7 composed of SiN. The TbFeCo recording layer 10 and the GdFeCo reproducing layer 24 are magnetostatically coupled to one another through the non-magnetic layer 9 and the magnetic layer (first auxiliary magnetic film) 28 composed of the GdFeCo alloy.

The reproducing layer (second auxiliary magnetic layer) 24 composed of the GdFeCo alloy is a magnetic film which exhibits in-plane magnetization at room temperature and which causes transition to a perpendicularly magnetizable film at a temperature exceeding a critical temperature $Tcr_{12}$ higher than room temperature. In this embodiment, $Gd_{28}Fe_{56}Co_{16}$ is used as the reproducing layer 24, which behaves as an in-plane magnetizable film at room temperature and which is changed into a perpendicularly magnetizable film at a temperature exceeding the critical temperature $Tcr_{12}=175°$ C. The Curie temperature $Tc_2$ of the reproducing layer 24 is 340° C.

The magnetic layer (first auxiliary magnetic layer) 28 composed of the GdFeCo alloy is a magnetic film which exhibits perpendicular magnetization at room temperature and which causes transition to an in-plane magnetizable film at a temperature above a critical temperature $Tcr_{11}$ higher than room temperature. In this embodiment, $Gd_{21}Fe_{64}Co_{15}$ is used as the magnetic layer 28 composed of the GdFeCo alloy, which behaves as a perpendicularly magnetizable film at room temperature and which is changed into an in-plane magnetizable film at a temperature exceeding the critical temperature $Tcr_{11}=200°$ C. The Curie temperature $Tc_1$ of the magnetic layer 28 was 350° C.

Figure 15:
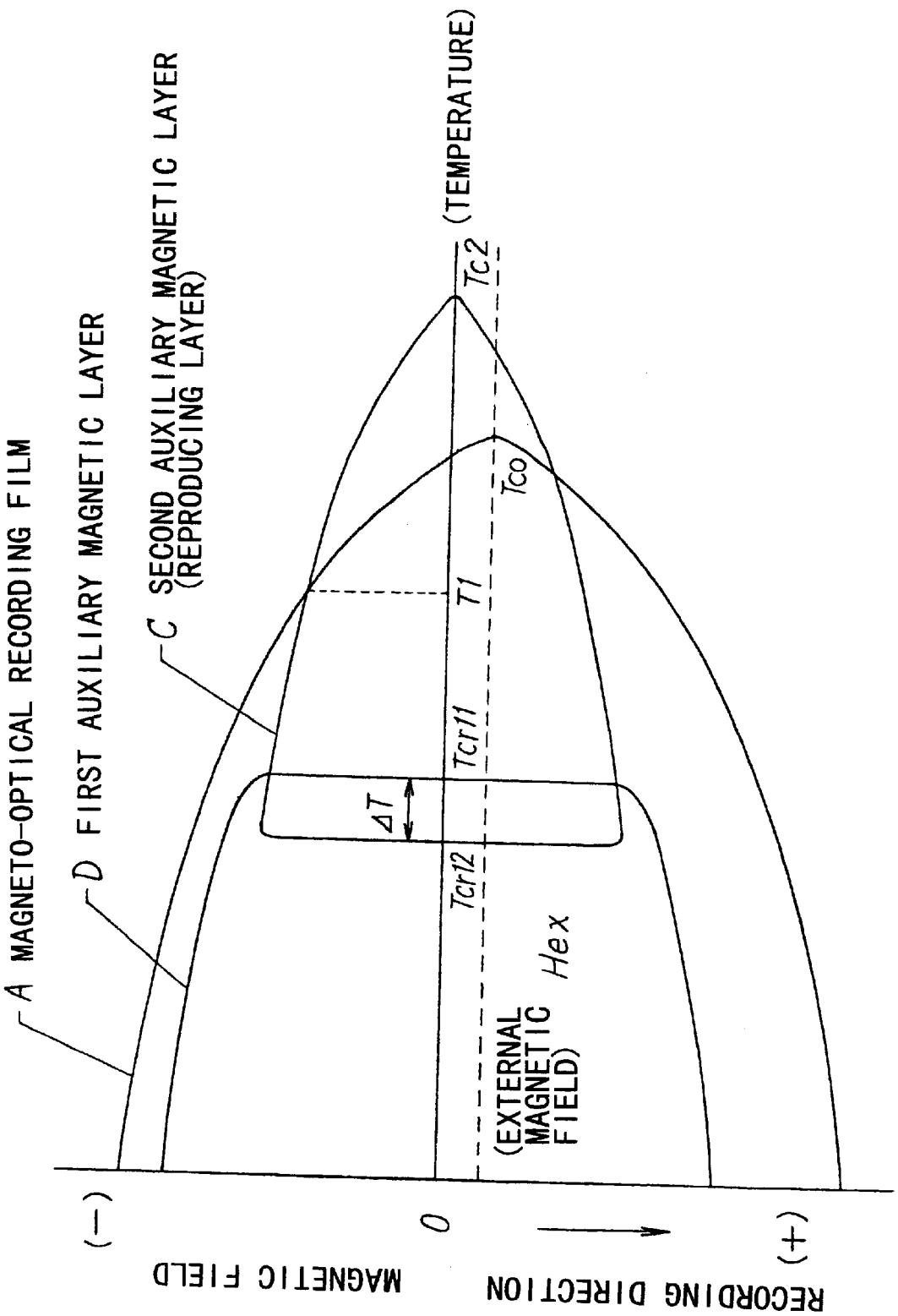
FIG. 15 shows the magnetization characteristic concerning the magneto-optical recording layer, the first auxiliary magnetic layer, and the second auxiliary magnetic layer of the magneto-optical recording medium produced in the third embodiment of the present invention.

The recording layer 10 is based on the use of the TbFeCo alloy having its Curie temperature Tco of 270° C. and its compensation temperature of not more than room temperature. That is, the relationship of room temperature$<Tcr_{12}<Tcr_{11}<Tc$, $Tc_1$, $Tc_2$ holds concerning the Curie Temperature Tco of the recording layer 10, the Curie temperature $Tc_2$ and the critical temperature $Tcr_{12}$ of the reproducing layer 24, and the Curie temperature $Tc_1$ and the critical temperature $Tcr_{11}$ of the magnetic layer 28 (first auxiliary magnetic film). The temperature relationship is shown in FIG. 15. In the same manner as FIG. 11, FIG. 15 shows the magnetic characteristics of the recording layer 10, the reproducing layer 24, and the magnetic layer 28 (first auxiliary magnetic film) of the magneto-optical recording medium 100 in a state in which a constant DC magnetic field Hex is applied in the recording direction to the magneto-optical recording medium 100. As shown in FIG. 15, temperature ranges for the reproducing layer 24 and the magnetic layer 28 (first auxiliary magnetic film) to exhibit the perpendicular magnetization overlap in a relatively narrow temperature range (arrow in FIG. 15). In this temperature range, the recording layer 10, the magnetic layer 28, and the reproducing layer 24 can be magnetically coupled.

Figure 16A:
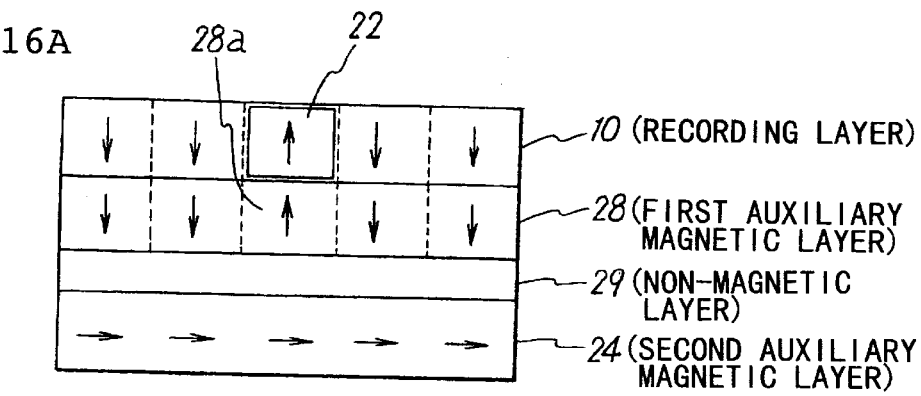
FIG. 16A illustrates the principle of reproduction on the magneto-optical recording medium produced in the third embodiment of the present invention, showing a magnetization state before irradiation with the reproducing light beam.
Figure 16B:
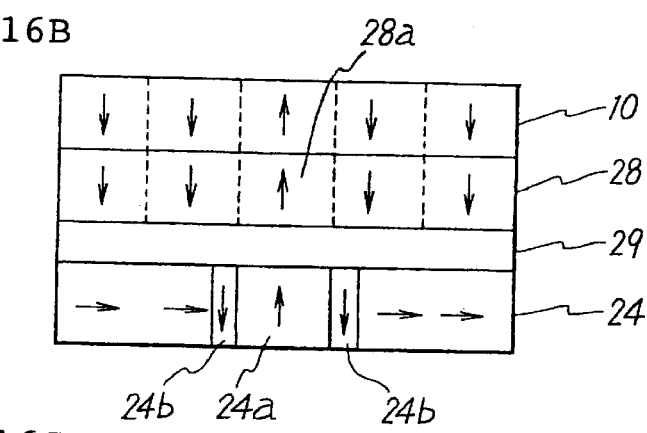
FIG. 16B shows a state in which the magnetization in the recording layer is transferred to the second auxiliary magnetic layer in the temperature-increasing process effected by irradiation with the reproducing light beam.
Figure 16C:
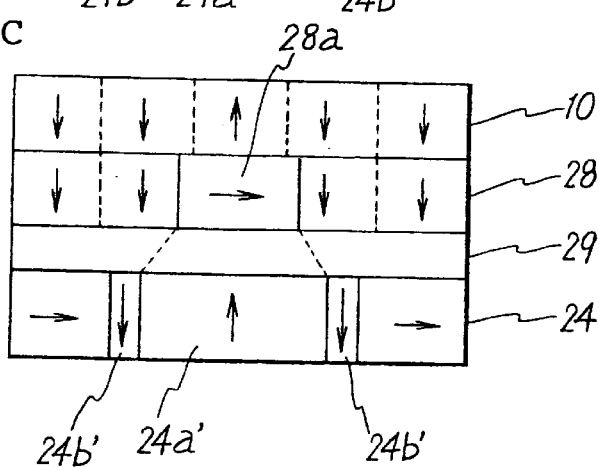
FIG. 16C shows a state in which the magnetic domain transferred to the second auxiliary magnetic layer is magnified.
Figure 17:
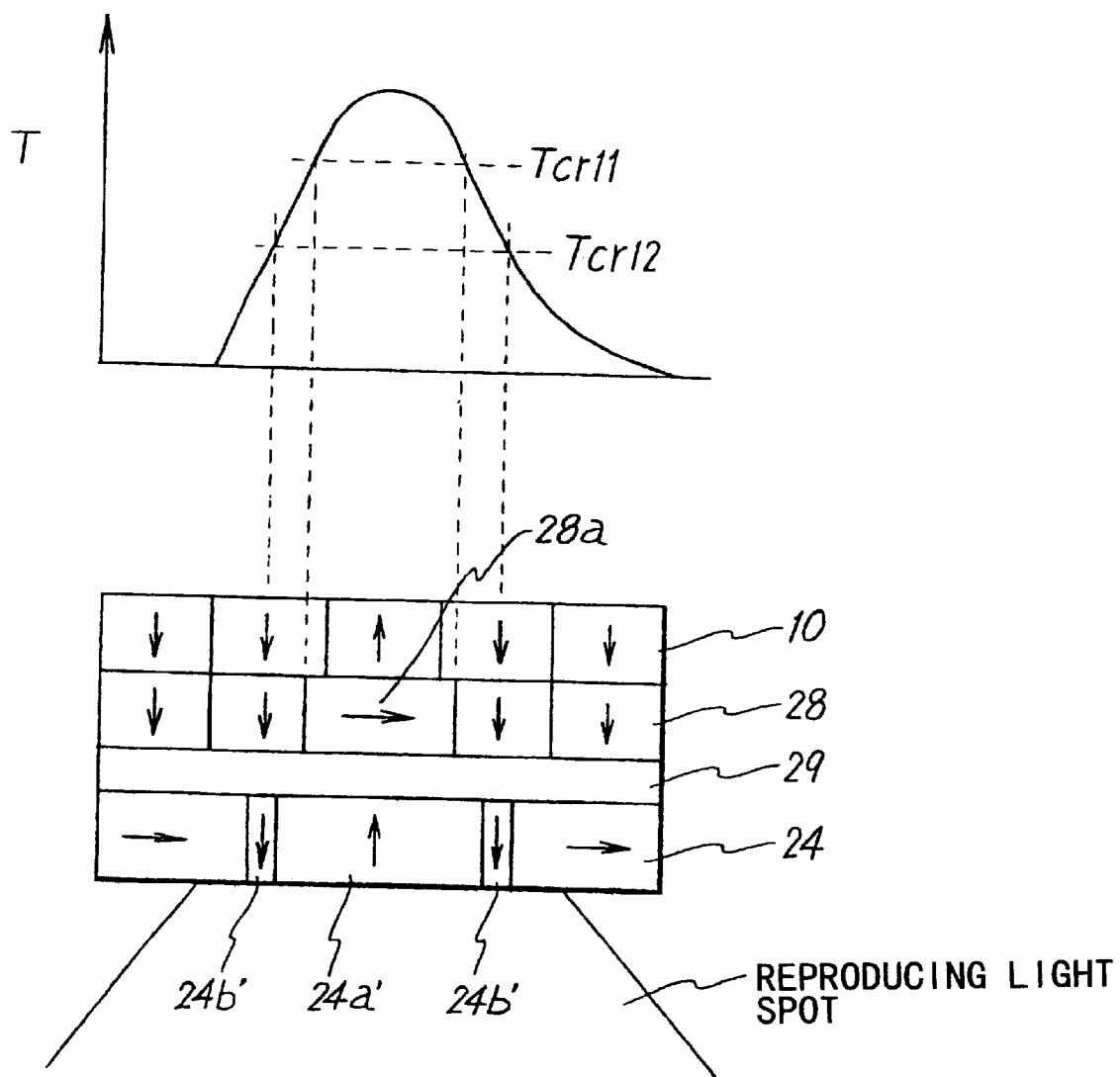
FIG. 17 shows a relationship between the temperature distribution and the magnetization state of the medium shown in FIG. 16.
Figure 18A:
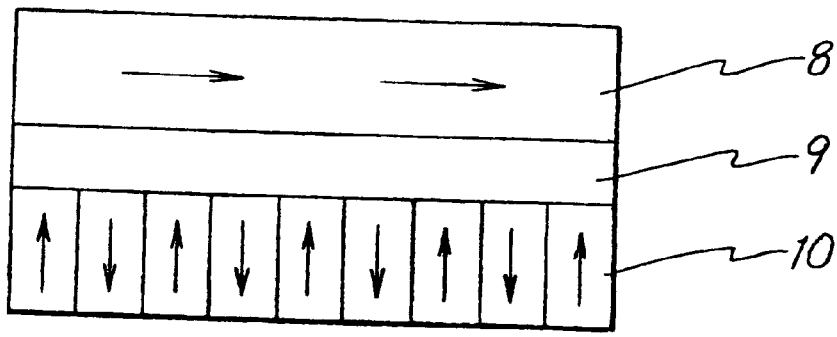
FIG. 18A conceptually shows magnetization states of the respective layers of the magneto-optical recording medium before reproduction.
Figure 18B:
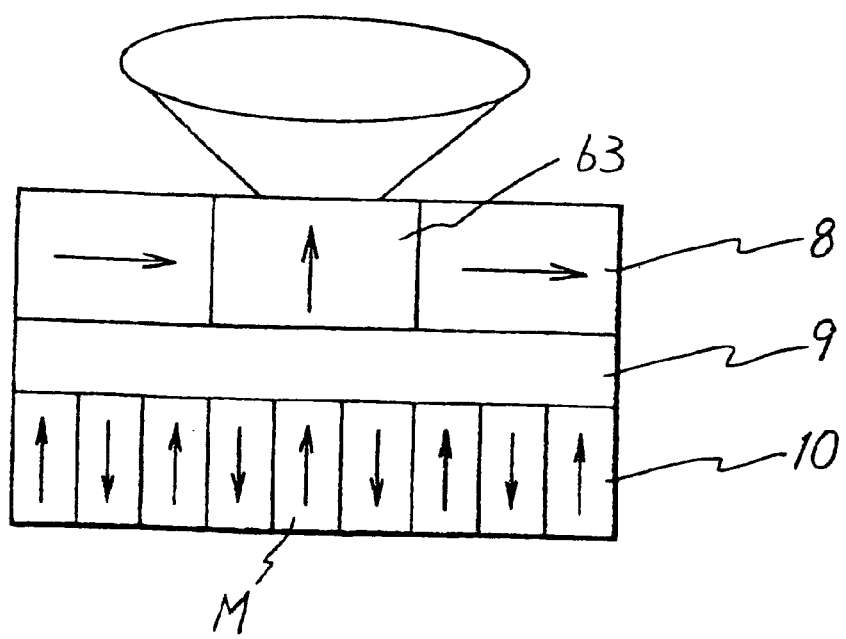
FIG. 18B conceptually shows magnetization states of the respective layers of the magneto-optical recording medium during reproduction.

The principle of reproduction on the magneto-optical disk 100 shown in FIG. 14 is the same as that explained with reference to FIG. 16. That is, the reproducing layer 24 of the magneto-optical disk 100 is irradiated with the reproducing light beam, and the temperature of the reproducing layer 24 is raised. The area, in which the temperature exceeds the critical temperature $Tcr_{12}$, causes transition from the in-plane magnetization to the perpendicular magnetization, simultaneously with which the magnetization in the recording layer 10 is transferred to the reproducing layer 24 by the aid of the magnetostatic coupling force. The reproducing light power and $Tcr_{12}$ are adjusted so that the area in which the temperature exceeds the critical temperature $Tcr_{12}$ is larger than the magnetic domain in which the magnetization information of the recording layer 10 is recorded. Therefore, the portion of the reproducing layer 24 having the perpendicular magnetization is magnified to be larger than the magnetic domain in the recording layer 10 as the transfer source (see FIG. 16C). On the other hand, the perpendicular magnetization in the magnetic layer 28 undergoes transition to the in-plane magnetization in the area in which the temperature exceeds the critical temperature $Tcr_{11}$ existing inside the area in which the temperature exceeds the critical temperature $Tcr_{12}$ in accordance with the temperature distribution of the magneto-optical disk 100. The in-plane magnetization area in the magnetic layer 28 intercepts the leakage magnetic field directed from the recording layer 10 to the reproducing layer 24, especially in the non-recording direction. Accordingly, the magnification in the reproducing layer 24 is facilitated, simultaneously with which C/N of the reproduced signal obtained from the recording layer 24 is improved. In the present invention, it is required to satisfy $Tcr_{12}<Tcr_{11}$. However, it is preferable that the difference in temperature $\Delta T$ between $Tcr_{12}$ and $Tcr_{11}$ is selected so that C/N of the reproduced signal is optimized, and the reproduced signal intensity brought about by the magnetic domain magnification is maximized.

When the recording signal recorded on the recording layer 10 of the magneto-optical disk 100 is reproduced, the reproducing power is modulated to have the two powers in synchronization with the reproducing clock or the integral multiple thereof (recording clock or a cycle created by the multiplication of an integer and the reproducing clock), as explained in the principle of the reproducing method of the present invention. The reduction and the extinguishment of the magnified magnetic domain may be caused by using any one of the low power and the high power as described above. However, in this embodiment, the reproducing light beam to transfer and magnify the magnetic domain was modulated to have the low power, and the reproducing light beam to reduce or extinguish the magnified magnetic domain was modulated to have the high power. The power levels are applied during the period in which the recording track is subjected to scanning by irradiating the magneto-optical disk with the reproducing light beam.

A heat diffusion layer may be formed between the non-magnetic layer 29 and the first auxiliary magnetic layer 28, concerning the structure of the magneto-optical disk 100 shown in FIG. 14. The heat diffusion layer serves to facilitate the magnification of the magnetic domain by diffusing, in the in-plane direction of the film, the heat accumulated between the non-magnetic layer 26 and the first auxiliary magnetic layer 28. Those usable as the heat diffusion layer include materials having high thermal conduction, such as Al, AlTi, AlCr, Ag, Au, and Cu.

According to the reproducing method on the magneto-optical recording medium of the present invention, it is possible to perform the magnetically induced super resolution-based reproduction in which the amount of light to contribute to the reproduction output in accordance with the magnetic mask is hardly decreased, or the amount of light is not decreased, as compared with the ordinary magnetically induced super resolution type magneto-optical recording medium provided with the mask function. The use of the magneto-optical recording medium and the reproducing method thereon according to the present invention makes it possible to perform reproduction independently with a recording mark which is extremely minute as compared with the spot diameter of the reproducing light beam. Therefore, it is possible to remarkably improve the recording density of the magneto-optical recording medium. Further, the use of the magnetic domain magnification-based reproduction makes it possible to amplify the reproduced signal and greatly improve C/N of the reproduced signal.

The reproducing method of the present invention makes it possible to reliably execute the process of transferring the magnetic domain, magnifying the transferred magnetic domain, and extinguishing the magnified magnetic domain by optically modulating the reproducing light power.

Therefore, this method is extremely useful to practically use the method for magnifying and reproducing the magnetic domain. The magnetic field applied during the reproduction is appropriately the DC magnetic field, and it is unnecessary to use the alternating magnetic field. Therefore, the reproducing operation can be performed by using the cheap reproducing apparatus having the simple structure.

The magneto-optical recording medium of the present invention is constructed such that the relationship of room temperature<Tcr<Tcomp<Tco<Tc holds concerning the Curie temperature Tco of the magneto-optical recording film and the Curie temperature Tc and the compensation temperature Tcomp of the auxiliary magnetic film, and under the condition in which the external magnetic field Hex is applied to the magneto-optical recording medium, the temperature curve A of the transfer magnetic field which is generated by the external magnetic field Hex and the magneto-optical recording film, and the temperature curve B of the coercive force of the auxiliary magnetic film in the perpendicular direction intersect at the point between room temperature and the compensation temperature Tcomp of the auxiliary magnetic film, and the temperature curve A and the temperature curve B intersect at the point between the compensation temperature Tcomp of the auxiliary magnetic film and the Curie temperature Tco of the magneto-optical recording film. Accordingly, when the reproduction is performed under the DC external magnetic field by using the power-modulated reproducing light beam, it is possible to reliably execute the process of i) transferring the magnetic domain from the magneto-optical recording film to the auxiliary magnetic film, ii) magnifying the transferred magnetic domain, and iii) extinguishing the magnified magnetic domain. Therefore, the use of the magneto-optical recording medium makes it possible to perform recording of the recording signal with the minute magnetic domain which is smaller than the reproducing light spot, and then detect the minute magnetic domain while distinguishing it from other magnetic domains with the amplified reproduced signal. Accordingly, the magneto-optical recording medium of the present invention is extremely useful as the high density magneto-optical recording medium.

The magneto-optical recording medium of the present invention simultaneously comprises the first auxiliary magnetic layer which causes transition from the perpendicularly magnetizable film to the in-plane magnetizable film in the area in which the temperature exceeds the critical temperature $Tcr_{11}$, and the second auxiliary magnetic layer which causes transition from the in-plane magnetization to the perpendicular magnetization at the temperature exceeding the critical temperature $Tcr_{12}$. Accordingly, the leakage magnetic field from the recording layer to the second auxiliary magnetic layer is intercepted by the first auxiliary magnetic layer, while the magnetization information in the recording layer 10 can be reproduced with magnification in the second auxiliary magnetic layer. Therefore, the intensity of the signal reproduced from the second auxiliary magnetic layer is increased, and C/N of the reproduced signal is improved.

The optical recording medium and the reproducing method thereon according to the present invention are applicable to the magneto-optical recording media and the reproducing methods thereon disclosed in International Publications WO 97/22969 and WO 98-02878. The disclosure of the International Publications is incorporated herein by reference.

What is claimed is:

1. A method for performing reproduction on a magneto-optical recording medium for reproducing a recorded signal by irradiating the magneto-optical recording medium with a reproducing light beam to detect magnitude of an magneto-optical effect, the reproducing method comprising the steps of:

using, as the magneto-optical recording medium, a magneto-optical recording medium comprising a magneto-optical recording film having perpendicular magnetization, an auxiliary magnetic film which causes transition from an in-plane magnetizable film to a perpendicularly magnetizable film when a temperature exceeds a critical temperature Tcr and a non-magnetic film intervened between the magneto-optical recording film and the auxiliary magnetic film, the magneto-optical recording medium having a magnetic characteristic to satisfy a relationship of room temperature<Tcr<Tcomp<Tco<Tc concerning a Curie temperature Tco of the magneto-optical recording film and a Curie temperature Tc and a compensation temperature Tcomp of the auxiliary magnetic film; and executing reproduction of the recorded signal through the steps of irradiating the magneto-optical recording medium with the reproducing light beam which is power-modulated to have at least two light powers of $Pr_1$ and $Pr_2$ at the same cycle as that of a reproducing clock or at a cycle created by the multiplication of an integer and the reproducing clock while applying a DC magnetic field so that a recording magnetic domain in the magneto-optical recording film is transferred to the auxiliary magnetic film, the transferred magnetic domain is magnified, and the magnified magnetic domain is reduced or extinguished, wherein:

the magneto-optical recording medium is specified, under a condition in which an external magnetic field Hex is applied to the magneto-optical recording medium, such that a temperature curve A of a transfer magnetic field which is generated by the external magnetic field Hex and the magneto-optical recording film, and a temperature curve B of a coercive force of the auxiliary magnetic film in a perpendicular direction intersect at a point between room temperature and the compensation temperature Tcomp of the auxiliary magnetic film, and the temperature curve A and the temperature curve B intersect at a point between the compensation temperature Tcomp of the auxiliary magnetic film and the Curie temperature Tco of the magneto-optical recording film.

2. The method for performing reproduction on the magneto-optical recording medium according to claim 1, wherein the light power $Pr_1$ of the reproducing light beam is a power to heat the auxiliary magnetic film to a temperature from Tcr to Tcomp so that the recording magnetic domain in the magneto-optical recording film is transferred to the auxiliary magnetic film and the magnetic domain is magnified, and the light power $Pr_2$ of the reproducing light beam is a power to heat the auxiliary magnetic film to a temperature from Tcomp to Tco so that the magnified magnetic domain is reduced or extinguished.

3. The method for performing reproduction on the magneto-optical recording medium according to claim 1, wherein the transfer magnetic field is a sum of the external magnetic field Hex and a static magnetic field Ht from the magneto-optical recording film, and the coercive force of the auxiliary magnetic film in the perpendicular direction is a sum of a coercive force Hr in the perpendicular direction of the magnetic domain subjected to the transfer and an exchange coupling force Hw exerted on the magnetic domain subjected to the transfer by adjoining magnetic domains.

4. The method for performing reproduction on the magneto-optical recording medium according to claim 2, wherein the transfer magnetic field is a sum of the external magnetic field Hex and a static magnetic field Ht from the magneto-optical recording film, and the coercive force of the auxiliary magnetic film in the perpendicular direction is a sum of a coercive force Hr in the perpendicular direction of the magnetic domain subjected to the transfer and an exchange coupling force Hw exerted on the magnetic domain subjected to the transfer by adjoining magnetic domains.

* * * * *